United States Patent
Fukushima et al.

(10) Patent No.: US 12,542,489 B2
(45) Date of Patent: Feb. 3, 2026

(54) DC/DC CONVERTER CONTROL CIRCUIT, POWER SUPPLY CIRCUIT AND ELECTRONIC DEVICE

(71) Applicant: ROHM CO., LTD., Kyoto (JP)

(72) Inventors: Shun Fukushima, Kyoto (JP); Tomohisa Shinozaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 107 days.

(21) Appl. No.: 18/497,244

(22) Filed: Oct. 30, 2023

(65) Prior Publication Data

US 2024/0146193 A1    May 2, 2024

(30) Foreign Application Priority Data

Nov. 1, 2022   (JP) .................................. 2022-175782

(51) Int. Cl.
| | |
|---|---|
| *H02M 3/158* | (2006.01) |
| *H02M 1/00* | (2006.01) |
| *H02M 1/32* | (2007.01) |
| *H02M 1/36* | (2007.01) |

(52) U.S. Cl.
CPC ......... *H02M 3/158* (2013.01); *H02M 1/0006* (2021.05); *H02M 1/32* (2013.01); *H02M 1/36* (2013.01)

(58) Field of Classification Search
CPC .. H02M 3/158; H02M 3/1588; H02M 1/0006; H02M 1/007; H02M 1/0045; H02M 1/32; H02M 1/36
See application file for complete search history.

(56) References Cited

U.S. PATENT DOCUMENTS

| | | | | |
|---|---|---|---|---|
| 10,879,811 | B2* | 12/2020 | Fukushima | H02M 1/32 |
| 2011/0285366 | A1* | 11/2011 | Huang | H02M 3/156 323/282 |
| 2018/0129234 | A1* | 5/2018 | Melgar | H02M 3/1588 |
| 2022/0037998 | A1* | 2/2022 | Li | H02M 1/08 |
| 2022/0393593 | A1* | 12/2022 | Fukushima | H02M 1/08 |

FOREIGN PATENT DOCUMENTS

JP      2005-130622      5/2005

* cited by examiner

*Primary Examiner* — Alex Torres-Rivera
(74) *Attorney, Agent, or Firm* — Fish & Richardson P.C.

(57) ABSTRACT

The present disclosure provides a switch drive circuit. The switch drive circuit is configured to drive a load switch that is a PMOS transistor connected between a high-side transistor and a load. The switch drive circuit is configured to be switchable between (i) a first mode in which the PMOS transistor is fully turned on and (ii) a second mode in which a drive voltage corresponding to the output signal of the first error amplifier is supplied to a gate of the PMOS transistor. A charge pump circuit is configured to operate at least during startup of a boost DC/DC converter. A first rectifying element is configured to apply an output voltage of the charge pump circuit to a bootstrap pin.

21 Claims, 20 Drawing Sheets

DC/DC CONVERTER CONTROL CIRCUIT, POWER SUPPLY CIRCUIT AND ELECTRONIC DEVICE

TECHNICAL FIELD

The present disclosure relates to a DC/DC converter.

BACKGROUND

In order to operate devices that need a voltage higher than a power supply voltage, a boost direct-current to direct current (DC/DC) converter is used. A boost DC/DC converter is located between an input line and an output line, and is always on via an inductor and a body diode of a high-side transistor. Thus, in a stop period of a boost DC/DC converter, a voltage equivalent to an input voltage is also generated in the output line and supplied to a load.

If supply of a voltage is prevented from being supplied to a load during the stop period of the boost DC/DC converter, a load switch is disposed between the high-side transistor and the output line. Alternatively, a high-side switch in substitution for the load switch may be disposed between the input line and the inductor. During the stop period of the boost DC/DC converter, a voltage is prevented from being generated at the output line by means of turning off the load switch or the high-side switch.

PRIOR ART DOCUMENT

[Patent Publication]
[Patent document 1]: Japan Patent Publication No. 2005-130622

SUMMARY OF THE PRESENT DISCLOSURE

DETAILED DESCRIPTION OF THE EMBODIMENTS

Summary of Embodiments

Figure 1:
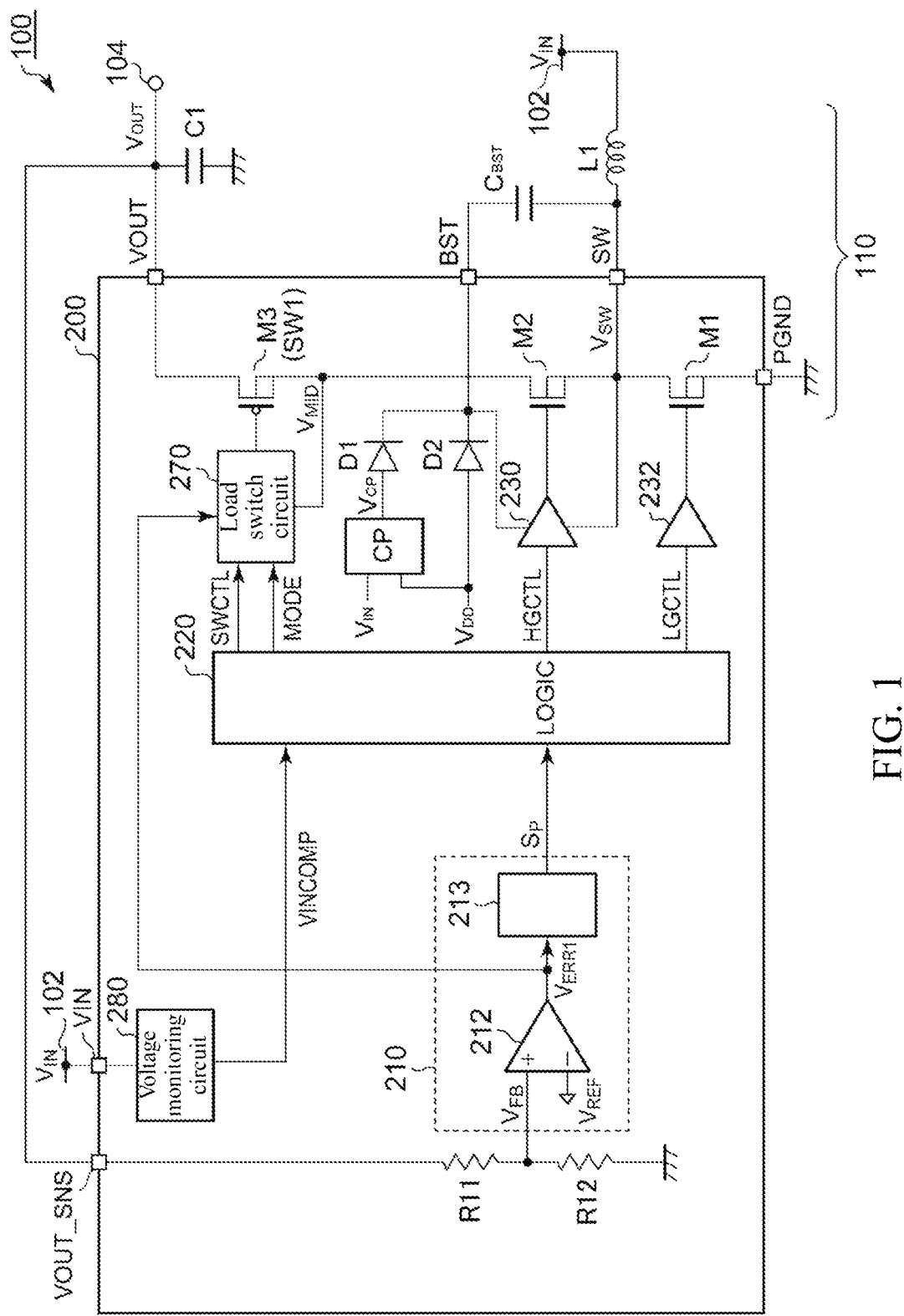
FIG. 1 is a circuit diagram of a boost DC/DC converter according to an embodiment.

A summary of several exemplary embodiments of the disclosure is given below. The summary serves as the introduction of the detailed description to be given shortly, and aims at providing fundamental understanding of the embodiments by describing several concepts of one or more embodiments in brief. It should be noted that the summary is not to be construed as limitations to the scope of the application or disclosure. For the sake of better description, "one embodiment" sometimes refers to one embodiment (an implementation example or a variation example) or multiple embodiments (implementation examples or variation examples) described in the disclosure.

The summary is not a comprehensive summary of all conceivable embodiments, nor does it intend to specify important elements of all embodiments or to define the scope of a part of or all aspects. The sole object is to provide an introduction for the more detailed description below, and sometimes several concepts of one or more embodiments are presented in a simplified form.

A control circuit according to an embodiment is used for a boost DC/DC converter including N-type high-side transistor and low-side transistor. The control circuit includes: a bootstrap pin, configured to connect to an end of a bootstrap capacitor; a charge pump circuit, configured to operate at least during startup of the boost DC/DC converter; a first rectifying element, configured to apply an output voltage of the charge pump circuit to the bootstrap pin; a pulse modulator, including a first error amplifier configured to amplify an error between a feedback signal and a reference voltage according to an output voltage of the boost DC/DC converter, and configured to generate a pulse signal that is pulse-modulated according to an output signal of the first error amplifier; a logic circuit, configured to generate a high-side control signal and a low-side control signal based on the pulse signal; and a switch drive circuit, configured to drive a switch which is a P-channel metal oxide semiconductor (PMOS) transistor connected between the high-side transistor and a load or between an input terminal of the boost DC/DC converter and an inductor. The switch drive circuit is configured to be switchable between (i) a first mode in which the PMOS transistor is fully turned on; and (ii) a second mode in which a drive voltage corresponding to the output signal of the first error amplifier is supplied to a gate of the PMOS transistor.

According to the configuration above, by operating the switch drive circuit in the second mode, the PMOS transistor, the first error amplifier and the switch drive circuit form a low dropout (LDO) regulator, enabling the output voltage to be stabilized at its target level. Accordingly, at least one issue possibly generated in a boost DC/DC converter conventionally including a load switch or a high-side switch is solved.

Since the low dropout regulator operates based on the output signal of the first error amplifier, a feedback is provided to have the feedback signal approach the reference voltage. Thus, the output voltage can be stabilized at a target level totally identical to that in the first mode.

During startup of the boost DC/DC converter, the bootstrap capacitor is fully charged by a voltage generated by the charge pump circuit. Moreover, when a voltage of the bootstrap capacitor is lower than a gate-source threshold of the high-side transistor, the high-side transistor is turned off, and an output capacitor of the boost DC/DC converter is charged by a body diode of the high-side transistor. If the voltage of the bootstrap capacitor exceeds the gate-source threshold of the high-side transistor, the high-side transistor is turned on. After that, if the output voltage of the boost DC/DC converter reaches an input voltage, the boost DC/DC converter starts a switching operation and switches to a bootstrap operation. With the additionally provided charge pump circuit, the output voltage can be soft-started, and moreover, a coil current flowing through the inductor can be inhibited from rising drastically.

In one embodiment, the control circuit can further include a second rectifying element configured to apply a power supply voltage to the bootstrap pin.

In one embodiment, the charge pump circuit can also be configured to continue operating after completion of startup of the boost DC/DC converter. Accordingly, even if the startup has ended and the input voltage rises, the bootstrap operation can be maintained.

In one embodiment, the charge pump circuit can also be configured to start operation before the boost DC/DC converter starts to start up. In this case, the high-side transistor can be turned on substantially at the time when the startup starts. When a current flows through the body diode, due to a part of the current flowing to a bottom layer, there is a concern for malfunction caused by a parasitic bipolar element. With regard to the above, after the startup starts, the high-side transistor is immediately turned on, hence inhibiting malfunction.

In one embodiment, a current supply ability of the charge pump circuit is lower than a current supply ability of the second rectifying element. After the switching operation, the bootstrap capacitor is charged by the second rectifying element, and it is sufficient for the charge pump circuit to have the ability for increasing a gate voltage of the high-side transistor during startup. Thus, an increase in circuit area caused by the additionally provided charge pump circuit can be inhibited.

In one embodiment, the charge pump circuit can be an addition type charge pump circuit configured to add a voltage of a switching pin of the boost DC/DC converter and the power supply voltage.

In one embodiment, the switch drive circuit can (i) become the first mode when an input voltage of the boost DC/DC converter is lower than a threshold voltage that is predetermined, and (ii) become the second mode when the input voltage is higher than the threshold voltage. According to the configuration above, even if the input voltage rises, overvoltage can be inhibited since the output voltage is stabilized at the target level.

In one embodiment, the control circuit can further include: a first current detection circuit, configured to generate a first current detection signal indicating a coil current flowing through an inductor of the boost DC/DC converter when the boost DC/DC converter is in a switching operation; and a second current detection circuit, configured to generate a second current detection signal indicating a current flowing through the PMOS transistor when a switching operation of the boost DC/DC converter is stopped. The pulse modulator further includes a second error amplifier configured to amplify an error between the output signal of the first error amplifier and the first current detection signal to generate the pulse signal having a duty cycle according to an output of the second error amplifier. The switch drive circuit can further include a third error amplifier configured to amplify an error between the output signal of the first error amplifier and the second current detection signal, and configured to supply the drive voltage according to an output signal of the third error amplifier to the gate of the PMOS transistor in the second mode. By designing both of the boost DC/DC converter and the low dropout regulator to operate in a current mode, not only the first error amplifier but also a phase compensation current can be shared.

In one embodiment, the threshold voltage can be set within a range of 0.9 to 1.1 times of the target level of the output voltage. More preferably, the threshold voltage can be set within a range of 0.95 to 1.05 times of the target level of the output voltage.

In one embodiment, the threshold voltage can have hysteresis. Accordingly, the first mode and the second mode can be reciprocated to prevent unstable operation.

In one embodiment, both upper and lower thresholds of the threshold voltage having hysteresis can be higher than the target level of the output voltage. Within a range where a difference between the input voltage and the target level of the output voltage is small (referred to as a dead zone), neither the boost DC/DC converter nor the low dropout regulator is able to maintain the output voltage at the target level. In the configuration above, operation in the dead zone is performed in the first mode, and so the output voltage is prevented from being lower than the target level. Accordingly, the load is prevented from being inoperative.

In one embodiment, both upper and lower thresholds of the threshold voltage having hysteresis can be higher than the target level of the output voltage. In the configuration above, operation in the dead zone is performed in the second mode, and so the output voltage is prevented from being higher than the target level. Thus, when the input voltage rises drastically, overvoltage can be prevented.

In one embodiment, an upper threshold of the threshold voltage having hysteresis can be higher than the target level of the output voltage, and a lower threshold of the threshold voltage having hysteresis can be lower than the target level of the output voltage.

In one embodiment, the control circuit can further include: a first overcurrent protection circuit, configured to limit a coil current flowing through the inductor to not exceed a first threshold current; and a second overcurrent protection circuit, configured to limit the current flowing through the PMOS transistor in the second mode to not exceed a second threshold current. The switch drive circuit can enter the second mode when a duty cycle of the low-side control signal has decreased to a predetermined value and an overcurrent condition exists. In the overcurrent condition, if the duty cycle has decreased to the predetermined value and if operation continues in the first mode, the overcurrent condition persists. The output current can be limited if the second mode is selected in the condition above.

In one embodiment, the second threshold current can be lower than the first threshold current. Accordingly, the hysteresis in the first mode and the second mode can be set for a resistive load, and so oscillation can be inhibited.

In one embodiment, in the second mode, the switch drive circuit can transition to the first mode when the input voltage is lower than the threshold voltage and no overcurrent condition exists.

In one embodiment, in the first mode, the switch drive circuit can apply an on-voltage to the gate of the PMOS transistor, wherein the on-voltage is lower than a source voltage of the PMOS transistor by a predetermined voltage width.

In one embodiment, the switch drive circuit can change to a third mode when the boost DC/DC converter is stopped, and apply a voltage corresponding to the input voltage of the boost DC/DC converter to the gate of the PMOS transistor.

According to the configuration above, when the boost DC/DC converter is stopped, the switch (PMOS transistor) is not immediately turned off, and a voltage $V_C$ corresponding to the input voltage is applied to the gate of the PMOS transistor, accordingly enabling the PMOS transistor to operate as a source follower circuit (drain grounding circuit). At this point in time, the source voltage of the PMOS transistor, that is, a voltage $V_{MID}$ of a connecting node between the switch and the high-side transistor is clamped to $$V_{MID}=V_C+V_{GS}\approx V_{IN}+V_{GS},$$

hence preventing overvoltage. A voltage $V_{SW}$ of a connecting node (switch pin) between the high-side transistor and the low-side transistor becomes $$V_{SW}=V_{MID}+V_I=V_C+V_{GS}=V_F\approx V_{IN}+V_{GS}+V_F,$$

hence similarly preventing overvoltage of the switch pin. $V_F$ is a forward voltage of the body diode of the high-side transistor. Moreover, at this point in time, a voltage $V_L$ between two ends of the inductor becomes $$V_L=V_{IN}-V_{SW}=V_{IN}-(V_C+V_{GS}\pm V_F)\approx(V_{GS}+V_F),$$

such that the coil current reduces at a slope $-(V_{GS}+V_F)/L$ along with time.

In one embodiment, the switch drive circuit can connect the gate of the PMOS transistor with the input pin when the boost DC/DC converter is stopped. Accordingly, the input voltage $V_{IN}$ can be applied to the gate of the PMOS transistor.

In one embodiment, the control circuit can further include a high-side transistor, a low-side transistor and a PMOS transistor. The high-side transistor, the low-side transistor and the PMOS transistor can be external discrete elements.

In one embodiment, a pin is not necessarily provided at a connecting node between the high-side transistor and the PMOS transistor. Since the PMOS transistor as a switch can be used to clamp the voltage $V_{MID}$ of the connecting node between the high-side transistor and the PMOS transistor, a circuit element that inhibits jump of the connecting node is not needed, and a pin for connecting the circuit element is thus not needed.

In one embodiment, the control circuit can also be monolithically integrated on a semiconductor substrate. The so-called "monolithically integrated" includes a situation in which all constituting elements of a circuit are formed on a semiconductor substrate, or a situation in which main constituting elements of a circuit are integrated. In order to adjust circuit constants, a part of resistors or capacitors may be arranged outside the semiconductor substrate. By integrating circuits on one chip, the circuit area is reduced and characteristics of circuit elements are kept uniform.

EMBODIMENTS

Details of the present disclosure are given by way of the appropriate embodiments with reference to the accompanying drawings below. The same or equivalent constituent elements, parts and processes in the accompanying drawings are represented by the same denotations, and repeated description is omitted as appropriate. Moreover, the embodiments are not restrictive of the present disclosure but are illustrative. All features or combinations thereof described in the embodiments are not necessarily intrinsic features or combinations of the present disclosure.

In the description of the present application, an expression "a state of component A connected to component B" includes, in addition to a situation where component A and component B are directly connected, a situation where component A is indirectly connected to component B via another component, and the indirect connection does not result in substantial influences on their electrical connection or does not impair functions or effects exerted by their connection.

Similarly, an expression "a state of component C arranged between component A and component B" also includes, in addition to a situation where component A and component C, or component B and component C are directly connected, an indirect connection via another component, and the indirect connection does not result in substantial influences on their electrical connection or does not impair functions or effects exerted by their connection.

Moreover, the so-called "signal A (voltage or current) corresponding to signal B" (voltage or current) means that signal A is associated with signal B, and specifically means that (i) signal A is signal B, (ii) signal A is proportional to signal B, (iii) signal A is obtained by level shifting signal B, (iv) signal A is obtained by amplifying signal B, (v) signal A is obtained by inverting signal B, and (vi) any combination of the above. A person skilled in the art should understand that the range of "corresponding to" is determined according to the types and use of signals A and B.

The vertical axis and horizontal axis in the waveform diagrams or timing diagrams which are referred to in the disclosure are appropriately scaled up or scaled down for better understanding, and the waveforms are also simplified, exaggerated or emphasized for better understanding.

First Embodiment

FIG. 1 shows a circuit diagram of a boost DC/DC converter 100 according to a first embodiment. The boost DC/DC converter 100 (hereinafter referred to as DC/DC converter 100) boosts an input voltage $V_{IN}$ of an input terminal (input line) 102, stabilizes the input voltage $V_{IN}$ at a predetermined voltage level, and supplies the same to a load (not shown) connected to an output terminal (output line) 104.

The DC/DC converter 100 includes a main circuit 110 and a control circuit 200. The main circuit 110 includes an inductor L1, a low-side transistor (switching transistor) M1, a high-side transistor (synchronous rectifier transistor) M2, an output capacitor C1, a bootstrap capacitor $C_{BST}$ and a load switch SW1.

The control circuit 200 is a functional integrated circuit (IC) integrated on a semiconductor substrate (bare chip). In this embodiment, the low-side transistor M1, the high-side transistor M2 and a PMOS transistor M3 are integrated on the control circuit 200. The PMOS transistor M3 is configured as a load switch SW1.

In addition to the low-side transistor M1, the high-side transistor M2 and the PMOS transistor M3, the control circuit 200 further includes a pulse modulator 210, a logic circuit 220, a high-side driver 230, a low-side driver 232, a load switch drive circuit 270, a voltage monitoring circuit 280, resistors R11 and R12, a first rectifying element D1, a second rectifying element D2 and a charge pump circuit 240.

The control circuit 200 is provided with a switch pin SW, a ground pin PGND, an input pin $V_{IN}$, an output pin $V_{OUT}$, a sensing pin $V_{OUT\_SNS}$ and a bootstrap pin BST.

The switch pin SW is connected to an external inductor L1. The output pin $V_{OUT}$ is connected to an output capacitor C1. The low-side transistor M1 is connected between the switch pin SW and the ground pin PGND. The high-side transistor M2 and the PMOS transistor M3 are directly connected between the switch pin SW and the output pin $V_{OUT}$. The input pin $V_{IN}$ is supplied with an input voltage $V_{IN}$ of the DC/DC converter 100.

In this embodiment, the high-side transistor M2 may be a metal-oxide-semiconductor field-effect transistor (MOSFET), and a bootstrap circuit is incorporated into the DC/DC converter 100.

A bootstrap capacitor $C_{BST}$ is externally arranged between the bootstrap pin BST and the switch pin SW. The second rectifying element D2 supplies a power supply voltage $V_{DD}$ to the bootstrap pin BST. The power supply voltage $V_{DD}$ is a constant voltage generated by a power supply circuit not shown in the drawings, and has a voltage level higher than a gate threshold of the MOSFET. For example, the power supply voltage $V_{DD}$ is 5 V.

The charge pump circuit 240 operates at least during startup of the boost DC/DC converter 100, and generates a voltage (referred to as a charge pump voltage) $V_{CP}$ higher than the input voltage $V_{IN}$. For example, the charge pump voltage $V_{CP}$ can be set as $$V_{CP} \geq V_{IN} + V_{DD}$$

In one embodiment, the charge pump circuit 240 is an addition type charge pump circuit configured to add the switch voltage $V_{SW}$ and the power supply voltage $V_{DD}$.

The first rectifying element D1 and the second rectifying element D2 form a diode OR circuit, and supplies whichever that is higher between the power supply voltage $V_{DD}$ and the output voltage $V_{CP}$ of the charge pump circuit 240 to the bootstrap pin BST.

A voltage $V_{BST}$ of the bootstrap pin BST is supplied to an upper power line (power supply terminal) of the high-side driver 230.

The DC/DC converter is a converter with a constant voltage output, and the pulse modulator 210 generates a pulse signal $S_P$ that is pulse-modulated such that the output voltage $V_{OUT}$ of the DC/DC converter 100 approaches the target level $V_{OUT(REF)}$.

The output voltage $V_{OUT}$ is fed back to the sensing pin $V_{OUT\_SNS}$. The output voltage $V_{OUT}$ is divided by the resistors R11 and R12 to generate a feedback signal $V_{FB}$ indicating the output voltage $V_{OUT}$. The pulse modulator 210 includes a first error amplifier 212 and a pulse generator 213. The first error amplifier 212 amplifies an error between the feedback signal $V_{FB}$ and the reference voltage $V_{REF}$. The pulse generator 213 generates the pulse signal $S_P$ that is pulse-modulated according to an output signal $V_{ERR1}$ of the first error amplifier 212.

The target level $V_{OUT(REF)}$ of the output voltage $V_{OUT}$ is represented by the equation below.

$$V_{OUT(REF)} = V_{REF} \times (R11 + R12)/R12$$

The configuration or control method of the pulse modulator 210 is not specifically defined. For example, the pulse modulator 210 can be a controller in a voltage mode, or can be a controller in a peak current mode or an average current mode. Alternatively, the pulse modulator 210 can employ ripple control, and more specifically, a controller with hysteresis control (relay control), bottom detection on-time fixed control, or a peak detection off-time fixed control.

Moreover, the modulation method of the pulse modulator 210 is not specifically defined, and can be pulse width modulation, pulse frequency modulation or other modulation methods.

The logic circuit 220 generates a high-side control signal HGCTL and a low-side control signal LGCTL based on the pulse signal Sp. Moreover, the logic circuit 220 generates a control signal SWCTL of the PMOS transistor M3.

The high-side driver 230 drives the high-side transistor M2 based on the high-side control signal HGCTL. The low-side driver 232 drives the low-side transistor M1 based on the low-side control signal LGCTL.

The load switch drive circuit 270 drives the load switch SW1 which is the PMOS transistor M3 based on the control signal SWCTL. More specifically, the PMOS transistor M3 is turned on when the control signal SWCTL is at an on-level (for example, high), the PMOS transistor M3 is turned off when the control signal SWCTL is at an off-level (for example, low).

The load switch drive circuit 270 is configured to be switchable between two modes during an on-level (high) period of the control signal SWCTL. A control signal MODE in a predetermined mode is input to the load switch drive circuit 270.

The input pin $V_{IN}$ of the control circuit 200 is connected to the input line 102, and is applied with the input voltage $V_{IN}$. The voltage monitoring circuit 280 compares the input voltage $V_{IN}$ with a threshold voltage $V_{TH}$ to generate a comparison signal VINCOMP according to a comparison result. Herein, VINCOMP is high when $V_{IN} > V_{TH}$. The voltage monitoring circuit 280 can be implemented by a voltage comparator.

The logic circuit 220 receives the comparison signal VINCOMP, and sets the load switch drive circuit 270 to the first mode when the input voltage $V_{IN}$ of the boost DC/DC converter is lower than the threshold voltage $V_{TH}$ that is predetermined. Moreover, the logic circuit 220 sets the load switch drive circuit 270 to the second mode when the input voltage $V_{IN}$ is higher than the threshold voltage $V_{TH}$. The threshold voltage $V_{TH}$ can be predetermined to be approximately the target level $V_{OUT(REF)}$ of the output voltage $V_{OUT}$.

The PMOS transistor M3 is fully turned on when the load switch drive circuit 270 is in the first mode. For example, the load switch drive circuit 270 generates a voltage that is lower than the source voltage $V_{MID}$ of the PMOS transistor M3 by a predetermined voltage width ΔV, and supplies the voltage to the gate of the PMOS transistor M3. The predetermined voltage width ΔV is greater than a threshold voltage $V_{gs(th)}$ of the PMOS transistor M3.

The load switch drive circuit 270 supplies a drive voltage VG corresponding to the output signal $V_{ERR1}$ of the first error amplifier 212 to the gate of the PMOS transistor M3.

Figure 2:
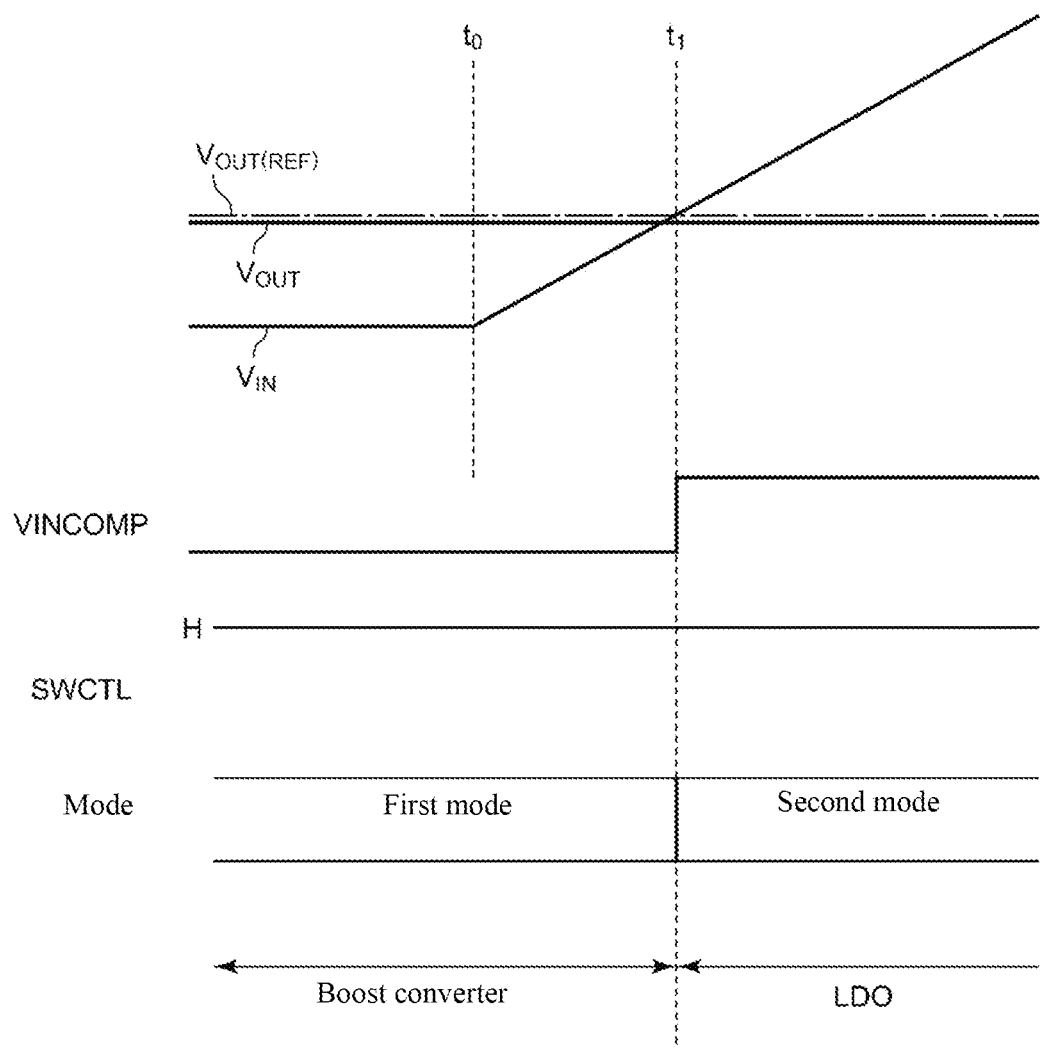
FIG. 2 is a diagram of the operation of the DC/DC converter in FIG. 1.

The configuration of the control circuit 200 is as described above. The operation of the control circuit 200 is to be described below. FIG. 2 shows a diagram of the operation of the DC/DC converter 100 in FIG. 1.

Before a timing $t_0$, the input voltage $V_{IN}$ is lower than the threshold voltage $V_{TH}$ (that is, the target level $V_{OUT(REF)}$ of the output voltage herein), and the comparison signal VIN-COMP is low. The DC/DC converter 100 serves as a boost converter and performs a switching operation, the load switch drive circuit 270 is in the first mode, and the PMOS transistor M3 is fully turned on.

By performing a switching operation by the DC/DC converter 100 based on the pulse signal Sp, the output voltage $V_{OUT}$ is stabilized at the target level $V_{OUT(REF)}$.

After the timing $t_0$, if the input voltage $V_{IN}$ starts rising, the duty cycle of the pulse signal $S_P$ is decreased. Moreover, at a timing t1, if the input voltage $V_{IN}$ drops to the target level $V_{OUT(REF)}$, the switching stops. Moreover, the comparison signal VINCOMP becomes high, and the load switch drive circuit 270 switches to the second mode.

If the load switch drive circuit 270 enters the second mode, the PMOS transistor M3, the first error amplifier 212 and the load switch drive circuit 270 form a low dropout regulator, and a feedback is applied to have the feedback signal $V_{FB}$ approaches the reference voltage V REF. As a result, the output voltage $V_{OUT}$ is stabilized at the target level $V_{OUT(REF)}$.

The operation of the DC/DC converter 100 is as described above. According to the control circuit 200, even if the input voltage $V_{IN}$ continues rising, the output voltage $V_{OUT}$ is stabilized at the target level $V_{OUT(REF)}$, hence preventing an overvoltage from being supplied to a load.

If error amplifiers are respectively disposed at the DC/DC converter and the low dropout regulator for these two systems, the circuit area is increased. Moreover, if offset voltages of the two error amplifiers are different, it is difficult for a target level of an output voltage of the DC/DC converter to be completely identical to a target level of an output voltage of the low dropout regulator. In this embodiment, the first error amplifier 212 of the pulse modulator 210 also serves as an error amplifier of the low dropout regulator. Thus, a target level of an output voltage of the DC/DC converter can be completely identical to a target level of an output voltage of the low dropout regulator.

The advantages of the DC/DC converter 100 will become more readily apparent in comparison with a comparison technique. Thus, two comparison techniques are described below.

(First Comparison Technique)

Figure 3:
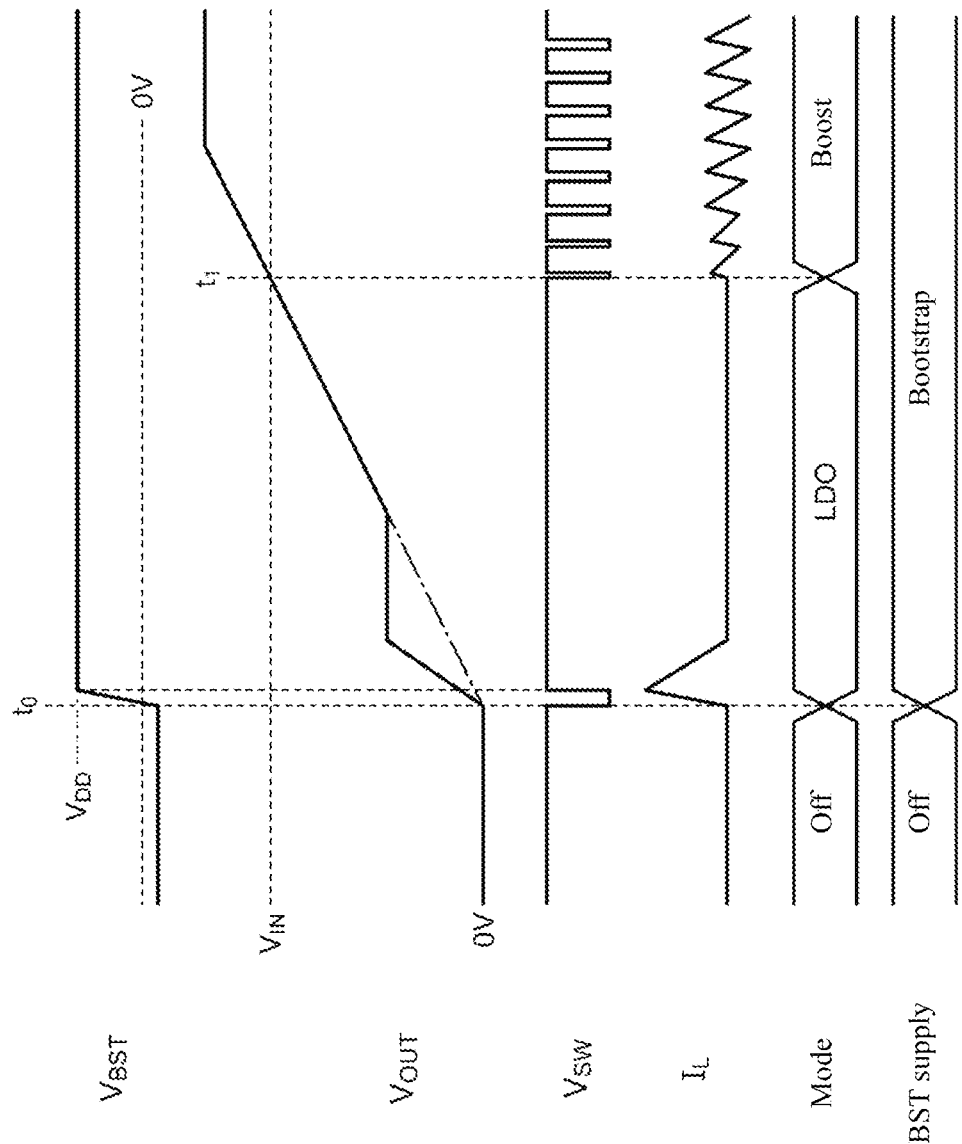
FIG. 3 is a waveform diagram of the operation of startup of a DC/DC converter of a first comparison technique.

FIG. 3 shows a waveform diagram of the operation of startup of a DC/DC converter of a first comparison technique. In the first comparison technique, the first rectifying element D1 and the charge pump circuit 240 are omitted. In the first comparison technique, together with starting of startup (timing to), the low-side transistor M1 is forcibly turned on for a certain period of time, and the switching voltage $V_{SW}$ is set to 0 V. Accordingly, the bootstrap capacitor $C_{BST}$ is charged by the second rectifying element D2, and a voltage between two ends thereof (bootstrap voltage) $V_{BST}$ rises to around the power supply voltage $V_{DD}$.

After the low-side transistor M1 is turned off, both of the high-side transistor M2 and the low-side transistor M1 are turned off, and the input voltage $V_{IN}$ is supplied to the switch pin SW via the inductor L1. The output voltage $V_{OUT}$ rises along with time. When $V_{OUT}<V_{IN}$, the DC/DC converter 100 operates as a low dropout regulator.

If the output voltage $V_{OUT}$ reaches the input voltage $V_{IN}$ at the timing $t_1$, the DC/DC converter 100 starts the switching operation and operates as a boost converter.

In a boost DC/DC converter, it is desired that the output voltage $V_{OUT}$ rises at a certain slope during startup, as shown by the single-dot dotted line (the single-dot dotted line is referred to an ideal straight line, and such control is referred to as passing rate control). In the first comparison technique, by turning on the low-side transistor M1 shortly after the startup, the coil current $I_L$ flowing through the inductor L1 rises drastically. Since $V_{OUT}<V_{IN}$, the coil current $I_L$ does not immediately restore to zero, and the coil current $I_L$ is supplied to the output capacitor C1, such that the output voltage $V_{OUT}$ rises significantly. Accordingly, it is difficult for the output voltage $V_{OUT}$ to rise at a certain slope as shown by the single-dot dotted line.

The issue of the first comparison technique is as described above.

(Second Comparison Technique)

Figure 4:
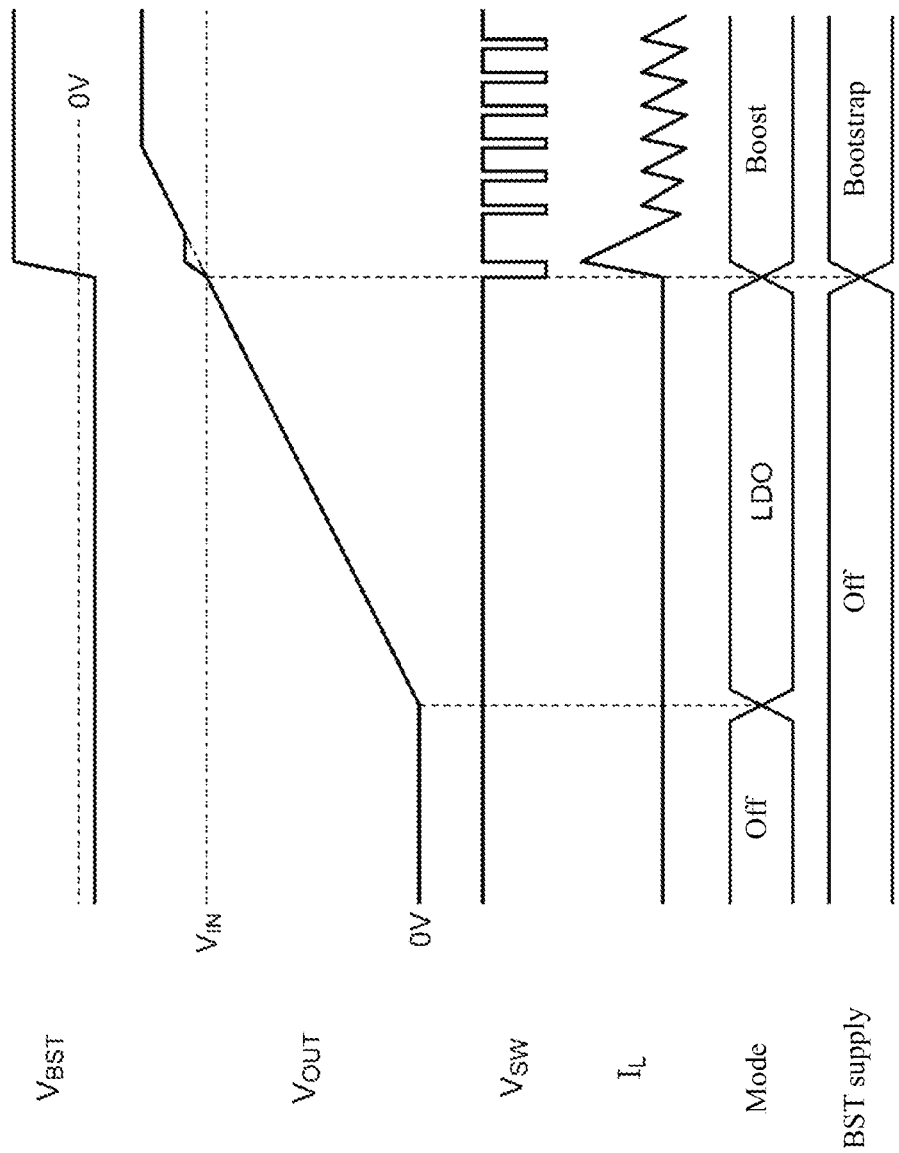
FIG. 4 is a waveform diagram of the operation of startup of a DC/DC converter of a second comparison technique.

FIG. 4 shows a waveform diagram of the operation of startup of a DC/DC converter of a second comparison technique. In the second comparison technique, similar to the first comparison technique, the first rectifying element D1 and the charge pump circuit 240 are omitted.

In the second comparison technique, after startup starts (timing to), charging of the bootstrap capacitor $C_{BST}$ is stopped during an operation period of the DC/DC converter serving as a low dropout regulator. Moreover, at the timing $t_1$, if the DC/DC converter starts to operate in a boost mode, charging of the bootstrap capacitor $C_{BST}$ also starts. In order to quickly increase the bootstrap voltage $V_{BST}$, the on-period of the low-side transistor M1 needs to be increased, and at the same time, the coil current $I_L$ of the inductor L1 rises drastically. If the coil current $I_L$ flows to the output capacitor C1, the output voltage $V_{OUT}$ deviates from the ideal straight line as indicated by the single-dot dotted line.

The issue of the second comparison technique is as described above. That is to say, when the charge pump circuit 240 is not provided, it is difficult for the output voltage $V_{OUT}$ to rise in a straight line during startup.

The operation of the first embodiment is to be described below.

Figure 5:
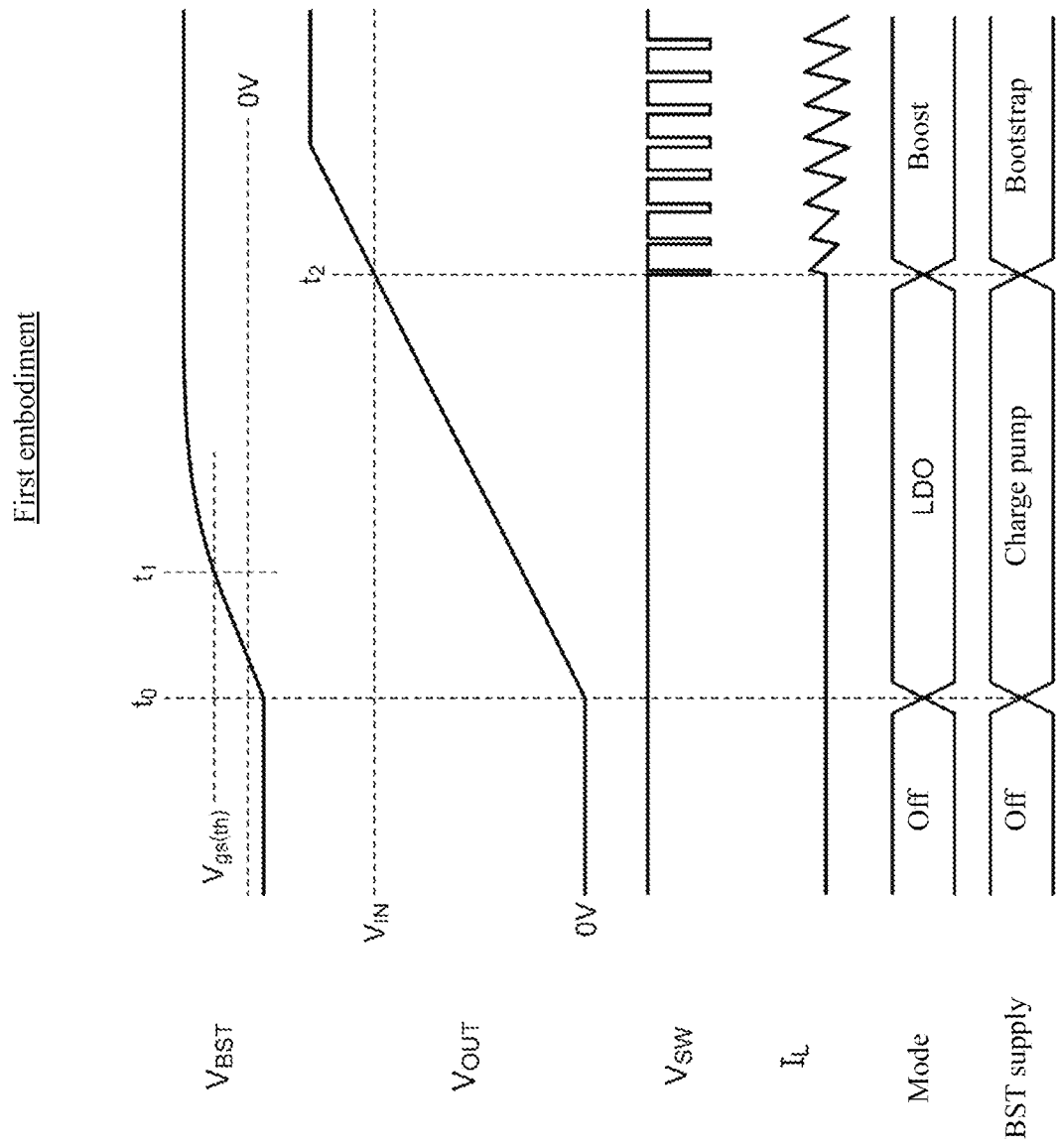
FIG. 5 is a waveform diagram of startup of a DC/DC converter according to a first embodiment.

FIG. 5 shows a waveform diagram of startup of the DC/DC converter 100 according to the first embodiment. In this embodiment, the charge pump circuit 240 can also be configured to start operation at the same time as the DC/DC converter 100 starts to start up.

At the timing $t_0$, the charge pump circuit 240 starts operation at the same time as the startup starts. Accordingly, the bootstrap voltage $V_{BST}$ rises slowly along with time. Because the bootstrap voltage $V_{BST}$ is lower than a gate-source threshold voltage $V_{gs(th)}$ of the high-side transistor M2 shortly after the startup, the high-side transistor M2 is turned off, and the output capacitor C1 is charged by a body diode of the high-side transistor M2.

Then, at the timing $t_1$, if the bootstrap voltage $V_{BST}$ exceeds the threshold voltage $V_{gs(th)}$, the high-side transistor M2 is turned on, and a current path from the body diode is switched to a channel. At the timing $t_2$, if the output voltage $V_{OUT}$ has reached the input voltage $V_{IN}$, the DC/DC converter 100 starts to operate in a boost mode.

The operation of the DC/DC converter 100 is as described above. According to the DC/DC converter 100, overshoot of the output voltage $V_{OUT}$ can be inhibited during startup, so that output voltage $V_{OUT}$ can rise smoothly.

Moreover, regarding a charging speed of the bootstrap capacitor $C_{BST}$ of the charge pump circuit 240, the bootstrap voltage $V_{BST}$ only needs to exceed the threshold voltage $V_{gs(th)}$ before the timing $t_2$ at which the output voltage $V_{OUT}$ reaches the input voltage $V_{IN}$. However, a current supply ability of the charge pump circuit 240 can be sufficiently small in comparison with a current supply ability of the second rectifying element D2. The reason for the above is that, during startup of the DC/DC converter 100 serving as a low dropout regulator, drive of the high-side transistor M2 is not needed and there is almost no discharge of the bootstrap capacitor $C_{BST}$. By having the current supply ability of the charge pump circuit 240 be smaller than the current supply ability of the second rectifier element D2, the area of the charge pump circuit 240 can be reduced.

Second Embodiment

The configuration of the DC/DC converter 100 of the second embodiment is the same as the configuration of that of the first embodiment. A difference from the first embodiment is that, the charge pump circuit 240 starts to start up before the DC/DC converter 100 starts to start up.

Figure 6:
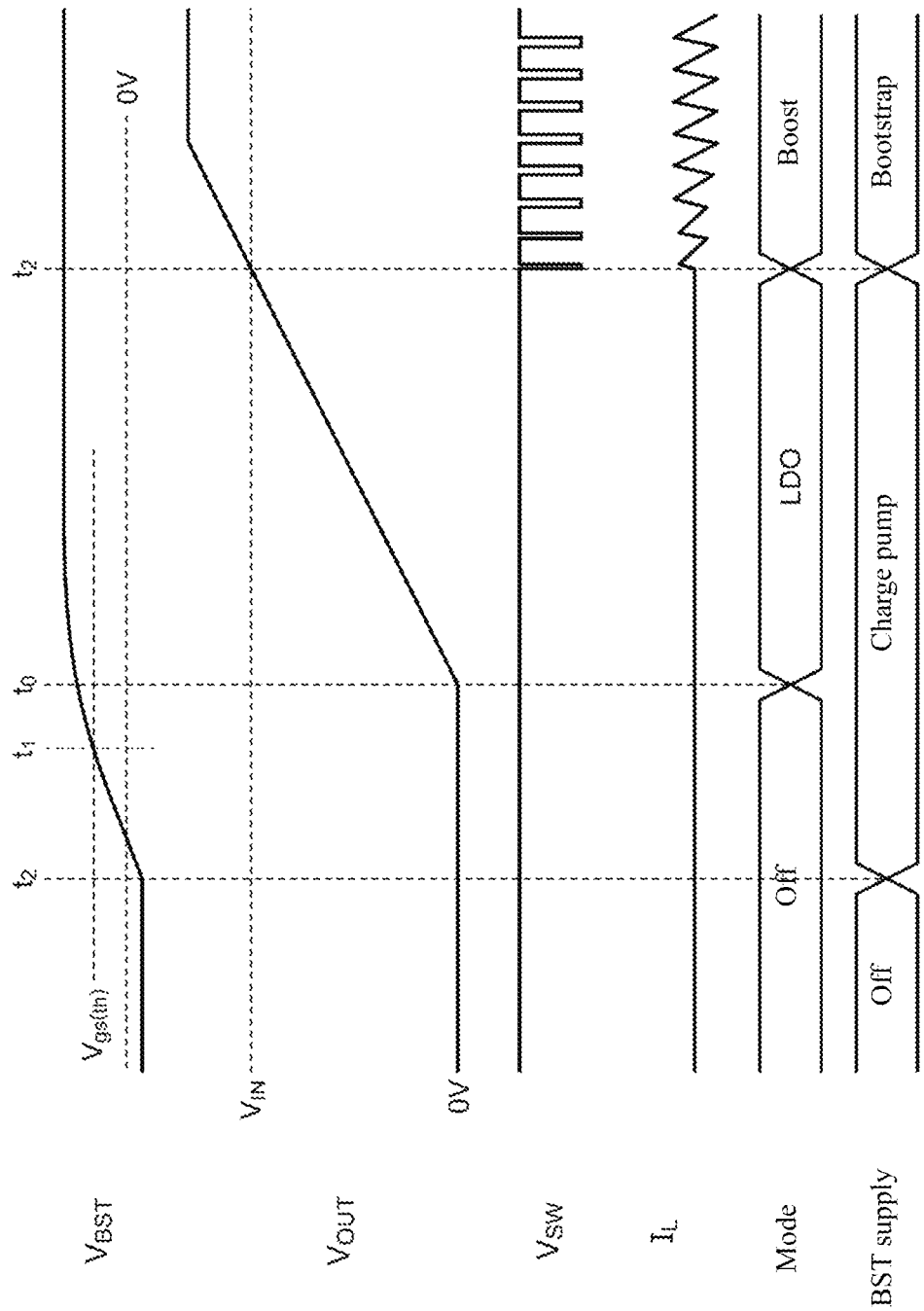
FIG. 6 is a waveform diagram of the operation of a DC/DC converter according to a second embodiment.

FIG. 6 shows a waveform diagram of the operation of the DC/DC converter 100 according to the second embodiment. At a timing $t_2$, the charge pump circuit 240 first starts operation. Accordingly, at a timing $t_1$ before a timing to at which startup starts, the bootstrap voltage $V_{BST}$ exceeds the threshold voltage $V_{gs(th)}$ of the high-side transistor M2. Thus, within a period between to and $t_2$ in which the DC/DC converter 100 operates in a low dropout regulator mode, the high-side transistor M2 becomes fully turned on, and a current flows through the channel instead of the body diode.

In the first embodiment, within a part ($t_0$ to $t_1$ in FIG. 5) of a period in which operation is performed in a low dropout regulator mode, a current flows through the body diode of the high-side transistor M2. When a current flows through the body diode, due to a part of the current flowing to a bottom layer, there is a concern for malfunction caused by a parasitic bipolar element. With regard to the above, in the second embodiment, after the startup starts, the high-side transistor M2 is immediately turned off, hence inhibiting malfunction.

Moreover, the charge pump circuit 240 is stopped after completion of startup of the DC/DC converter 100. In this case, circuit power consumption can be reduced.

Alternatively, the charge pump circuit 240 can continue operating after completion of startup of the DC/DC converter 100. In this case, if the input voltage $V_{IN}$ rises after the startup has ended, the bootstrap voltage $V_{BST}$ can still be maintained.

Figure 7:
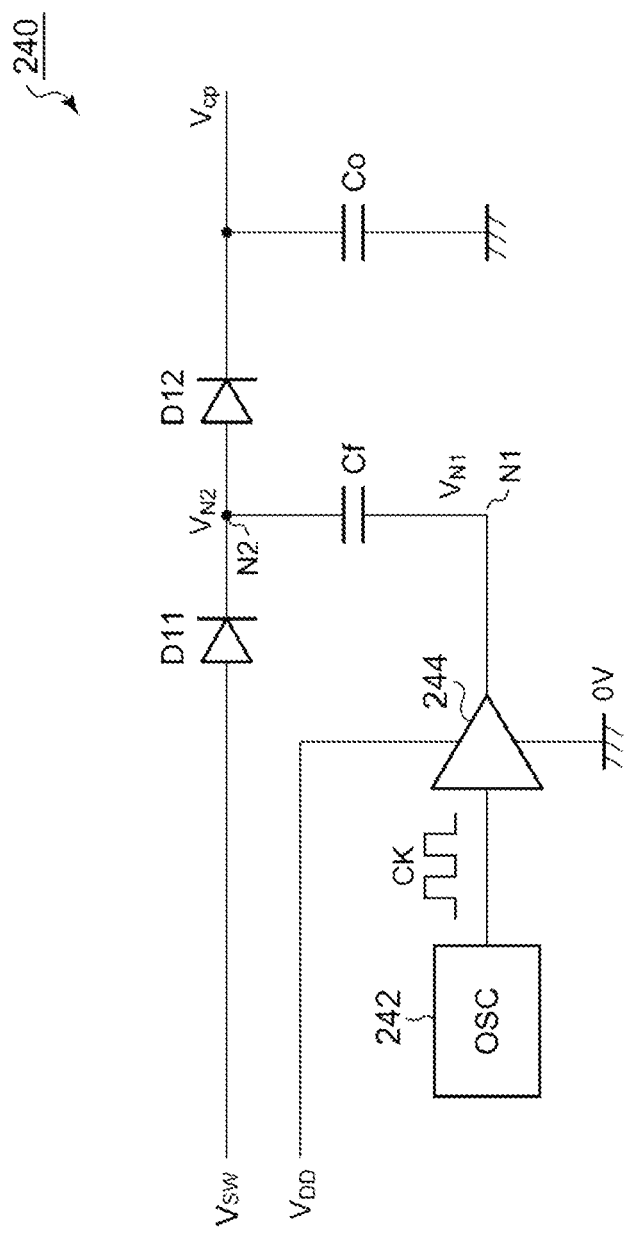
FIG. 7 is a circuit diagram of a configuration example of a charge pump circuit.

FIG. 7 shows a circuit diagram of a configuration example of the charge pump circuit 240. The charge pump circuit 240 is an addition type charge pump circuit that adds the switching voltage $V_{SW}$ of the converter and the power supply voltage $V_{DD}$, and is implemented by a Cochcroft-Walton circuit including capacitors Cf and Co, diodes D11 and D12, an oscillator 242 and a driver 244.

The oscillator 242 generates a clock signal CK. The power supply voltage $V_{DD}$ is supplied to a power supply terminal of the driver 244. A voltage $V_{N1}$ of an output node N1 of the driver 244 alternately repeats $V_{DD}$ and 0 V according to the clock signal CK.

The operation of the charge pump circuit 240 is described below. Moreover, voltage drops of the diodes D11 and D12 are omitted.

When the clock signal CK is low, the output voltage $V_{N1}$ of the driver 244 becomes to 0 V, and a voltage $V_{N2}$ of a node N2 becomes the switching voltage $V_{SW}$. At this point in time, the capacitor Cf is charged by the switching voltage $V_{SW}$.

When the clock signal CK is high, the voltage $V_{N1}$ of the output node N1 of the driver 244 becomes $V_{DD}$. At this point in time, a voltage between two ends of the capacitor Cf is kept at $V_{SW}$, and so the voltage $V_{N2}$ of the node N2 becomes $V_{SW}+V_{DD}$. At this point in time, the voltage $V_{N2}=V_{SW}+V_{DD}$ charges the capacitor Co. By repeating the operation above, the voltage $V_{CP}$ of the capacitor Co becomes $V_{SW}+V_{DD}$.

Moreover, the form or topology of the charge pump circuit 240 is not limited to the form or topology in FIG. 7, and various well-known circuits can be used.

Next, the threshold voltage $V_{TH}$ is to be described. If the input voltage $V_{IN}$ crosses over the threshold voltage $V_{TH}$ and changes, the first mode and the second mode are reciprocated, and circuit operations become unstable. Thus, it is desired that the threshold voltage $V_{TH}$ can be added with hysteresis.

Figure 8:
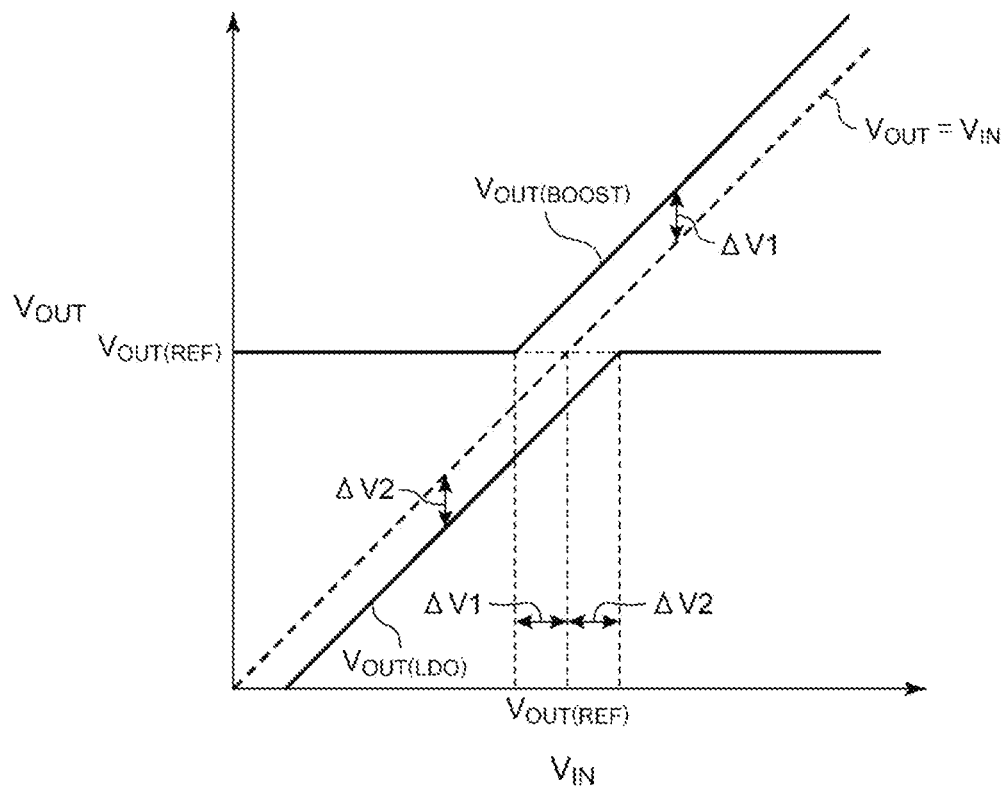
FIG. 8 is a diagram of input/output characteristics of a boost DC/DC converter and a low dropout regulator.

FIG. 8 shows a diagram of input/output characteristics of a boost DC/DC converter and a low dropout regulator. Since a boost DC/DC converter is incapable of operating within a region narrower than the duty cycle, a minimum level of an output voltage $V_{OUT}(BOOST)$ of the boost DC/DC converter is higher than the input voltage $V_{IN}$ by $\Delta V1$. That is to say, outputting a voltage within a range of $V_{IN}$ to $V_{IN}+\Delta V1$ cannot be achieved.

On the other hand, since an on-resistance of the PMOS transistor M3 of the low dropout regulator is non-zero, a maximum level the output voltage $V_{OUT(LDO)}$ of the low dropout regulator is lower than the input voltage $V_{IN}$ by $\Delta V2$. That is to say, the low dropout regulator is incapable of outputting a voltage within a range of $V_{IN}$ to $V_{IN}-\Delta V2$.

Thus, even if the DC/DC converter 100 selects either of the first mode and the second mode, the output voltage $V_{OUT}$ cannot be kept at the target level $V_{OUT(REF)}$ within a range of $V_{IN}-\Delta V2$ to $V_{IN}+\Delta V1$. This is referred to as a dead zone.

Figure 9:
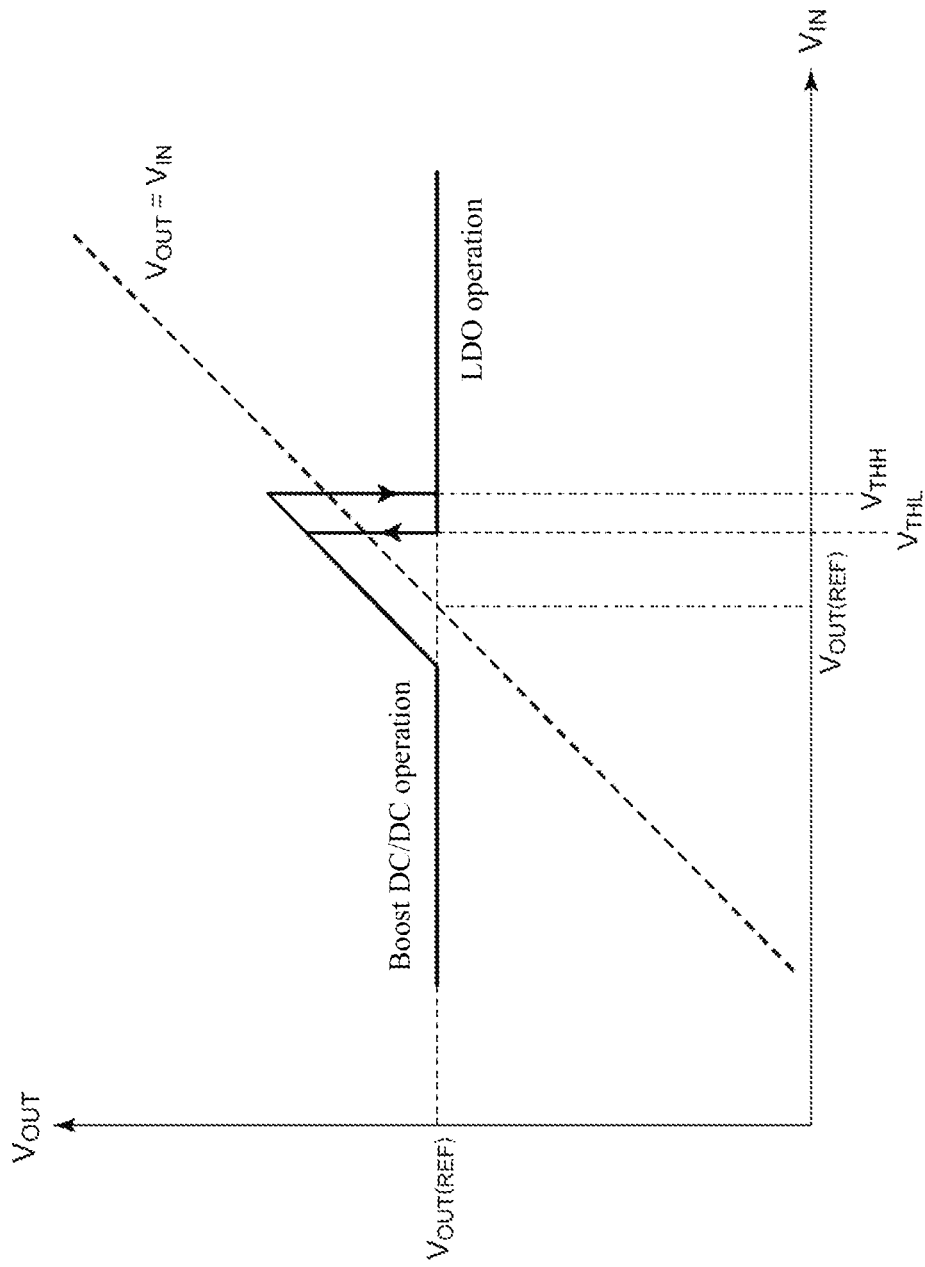
FIG. 9 is a diagram of transition of an output voltage $V_{OUT}$ of a DC/DC converter.

When the threshold voltage $V_{TH}$ is provided with hysteresis, both an upper threshold $V_{THH}$ and a lower threshold $V_{THL}$ can be predetermined to be higher than the target level $V_{OUT(REF)}$. FIG. 9 shows a diagram of transition of the output voltage $V_{OUT}$ of the DC/DC converter 100. In this case, since the DC/DC converter 100 operates as a boost DC/DC converter in the dead zone, it is ensured that the output voltage $V_{OUT}$ is higher than the target voltage $V_{OUT(REF)}$. The control above is more effective when undershoot of the output voltage $V_{OUT}$ is not desired.

Figure 10:
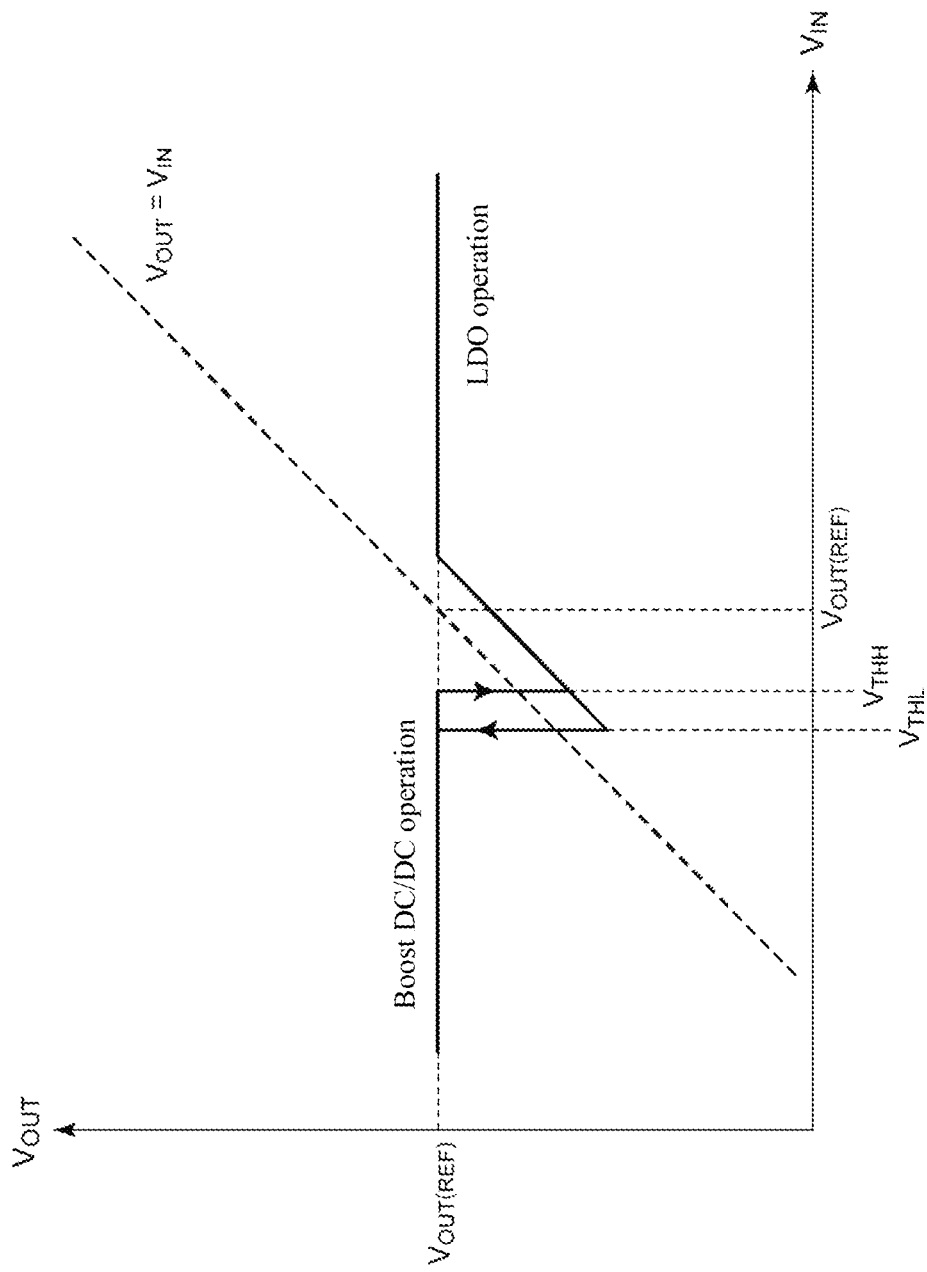
FIG. 10 is a diagram of transition of an output voltage $V_{OUT}$ of a DC/DC converter.

When the threshold voltage $V_{TH}$ is provided with hysteresis, both an upper threshold $V_{THH}$ and a lower threshold $V_{THL}$ can be predetermined to be lower than the target level $V_{OUT(REF)}$. FIG. 10 shows a diagram of transition of the output voltage $V_{OUT}$ of the DC/DC converter 100. In this case, since the DC/DC converter 100 operates as a low dropout regulator in the dead zone, the output voltage $V_{OUT}$ does not exceed the target voltage $V_{OUT(REF)}$. The control above is more effective when overshoot of the output voltage $V_{OUT}$ is not desired.

Figure 11:
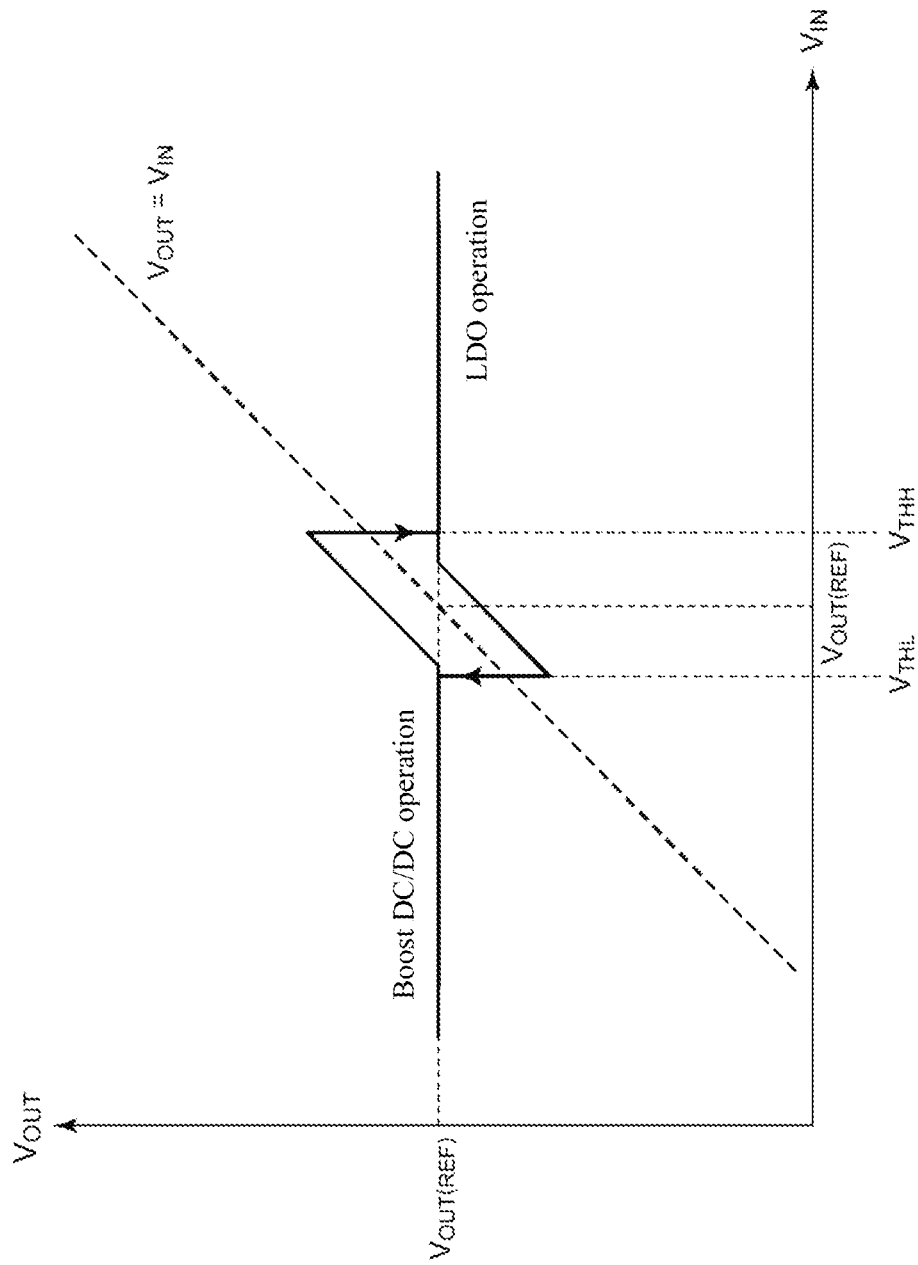
FIG. 11 is a diagram of transition of an output voltage $V_{OUT}$ of a DC/DC converter.

When the threshold voltage $V_{TH}$ is provided with hysteresis, the upper threshold $V_{THH}$ and the lower threshold $V_{THL}$ can also be predetermined with the target level $V_{OUT(REF)}$ in between. FIG. 11 shows a diagram of transition of the output voltage $V_{OUT}$ of the DC/DC converter 100. In this case, the DC/DC converter 100 operates as a low dropout regulator and a boost DC/DC converter in the dead zone. The control above is more effective when decreasing the amounts of both overshoot and undershoot is desired.

Moreover, the amount of overshoot and the amount of undershoot can be better decreased as the threshold voltage $V_{TH}$ approaches the target level $V_{OUT(REF)}$. According to the perspective above, a range of $V_{OUT(REF)} \times 0.9 < V_{TH} < V_{OUT(REF)} \times 1.1$ can be predetermined, and more preferably, a range of $V_{OUT(REF)} \times 0.95 < V_{TH} < V_{OUT(REF)} \times 1.05$ can be predetermined. The output voltage $V_{OUT}$ can be better inhibited from changing along with mode switching as the threshold voltage $V_{TH}$ gets closer to the target level $V_{OUT(REF)}$.

For example, in the case of FIG. 9, it can be predetermined that $V_{THH} = 1.03$ and $V_{THL} = 1.02$. In the case of FIG. 10, it can be predetermined that $V_{THH} = 0.98$ and $V_{THL} = 0.97$. In the case of FIG. 11, it can be predetermined that $V_{THH} = 1.01$ and $V_{THL} = 0.99$.

A specific configuration example of the control circuit 200 is to be described below.

First Implementation Example

Figure 12:
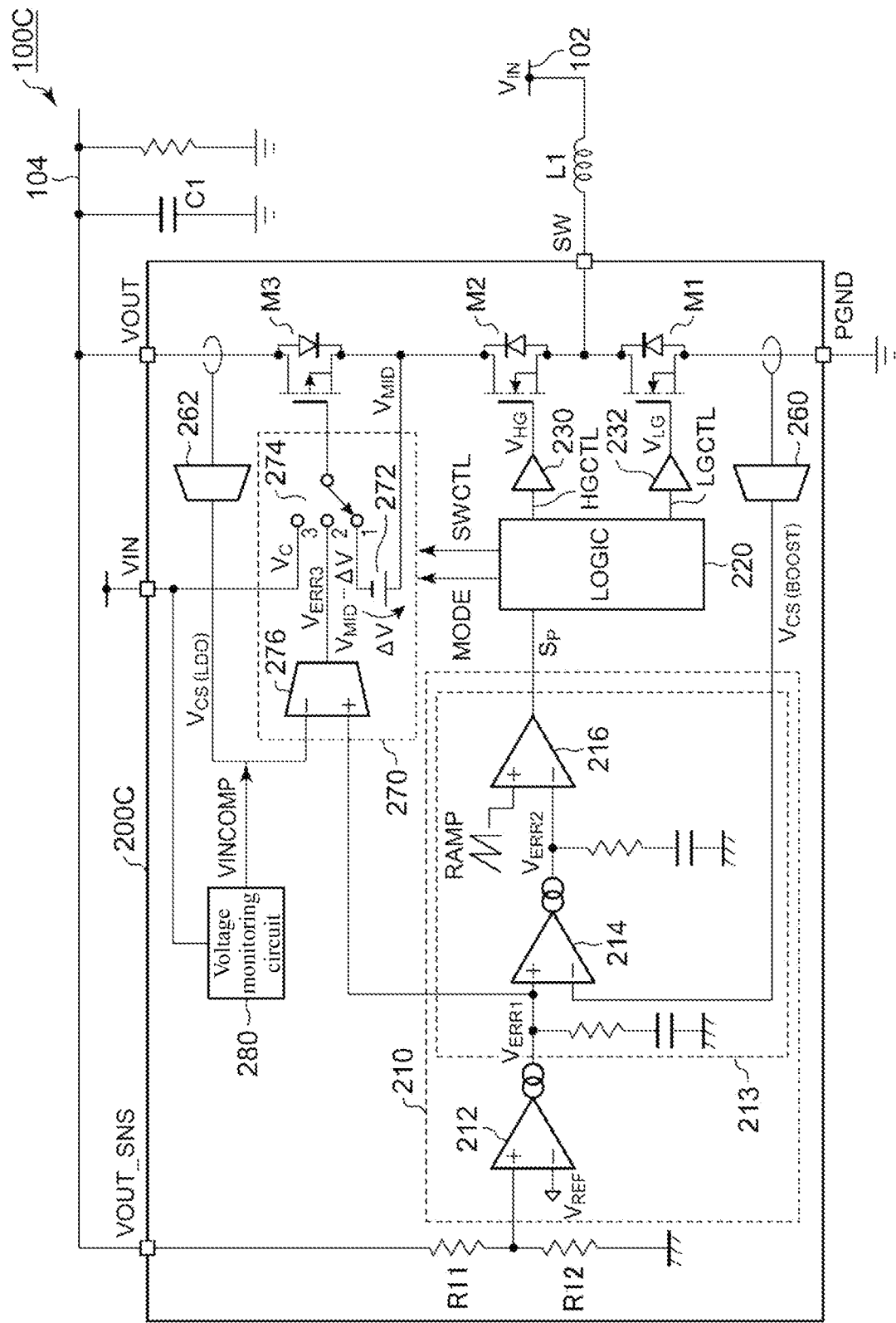
FIG. 12 is a circuit diagram of an example of a control circuit for a DC/DC converter.

FIG. 12 shows a circuit diagram of a control circuit 200 for a DC/DC converter of the first implementation example. Details associated with the configuration of the bootstrap circuit, more specifically, the first rectifying element D1, the second rectifying element D2, the charge pump circuit 240, the bootstrap pin BST and the bootstrap capacitor $C_{BST}$ are omitted from the drawing.

The pulse modulator 210 is a current-mode pulse width modulator. A first current detection circuit 260 generates a first current detection signal $V_{CS(BOOST)}$ indicating the coil current $I_L$ flowing through the inductor $L_1$ when the boost DC/DC converter 100 is in a boost operation. The first current detection signal $V_{CS(BOOST)}$ can be based on the current flowing through the low-side transistor M1 or can be based on the current flowing through the high-side transistor M2. Alternatively, the first current detection circuit 260 can also directly detect the coil current $I_L$.

The output signal $V_{ERR1}$ of the first error amplifier 212 is input to the pulse generator 213, as a target value (current instruction signal) of the current detection signal $V_{CS(BOOST)}$. The pulse generator 213 includes a second error amplifier 214 and a pulse width modulation (PWM) comparator 216. The second error amplifier 214 amplifies an error between the current instruction signal $V_{ERR1}$ and the current detection signal $V_{CS(BOOST)}$. The PWM comparator 216 compares an output signal $V_{ERR2}$ of the second error amplifier 214 with a slope or sawtooth wave periodic signal RAMP to generate a pulse signal Sp.

In the control circuit 200 in FIG. 12, the low dropout regulator formed by the PMOS transistor M3, the first error amplifier 212 and the load switch drive circuit 270 is configured to be a current mode. The second current detection circuit 262 generates a second current detection signal $V_{CS(LDO)}$ indicating a current $I_{OUT(LDO)}$ flowing through the PMOS transistor M3.

The load switch drive circuit 270 includes a voltage source 272, a selector 274 and a third error amplifier 276.

The third error amplifier 276 amplifies an error between the current instruction signal $V_{ERR1}$, that is, the output of the first error amplifier 212, and the second current detection signal $V_{CS(LDO)}$. In the second mode, the load switch drive circuit 270 supplies a drive voltage corresponding to an output signal $V_{ERR3}$ of the third error amplifier 276 to the gate of the PMOS transistor M3. More specifically, in the second mode, the selector 274 connects an output node of the third error amplifier 276 to a node of the PMOS transistor M3.

In the first mode, the voltage source 272 generates a gate voltage that fully turns on the PMOS transistor M3. More specifically, the voltage source 272 level shifts the source voltage $V_{MID}$ of the PMOS transistor M3 to generate a voltage ($V_{MID}-\Delta V$) that is lower than the source voltage $V_{MID}$ by a predetermined voltage width $\Delta V$. In the first mode, the selector 274 selects the output voltage of the voltage source 272, and supplies the output voltage to the gate of the PMOS transistor M3.

The load switch drive circuit 270 enters a third mode when the DC/DC converter 100 is stopped. In the third mode, the load switch drive circuit 270 applies a voltage $V_C$ corresponding to the input voltage $V_{IN}$ to the gate of the PMOS transistor M3. The voltage $V_C$ "corresponding to the input voltage $V_{IN}$" includes a case where the voltage $V_C$ is generated by using the input voltage $V_{IN}$. This includes a case where the voltage $V_C$ is equal to the input voltage $V_{IN}$, and further includes a case where the voltage $V_C$ is a voltage generated by forward level shifting or reverse level shifting the input voltage $V_{IN}$, or a case where the voltage $V_C$ is a voltage generated from multiplying the input voltage $V_{IN}$ by a coefficient. In this embodiment, the voltage $V_C$ is equal to the input voltage $V_{IN}$. In the third mode, the selector 274 connects the gate of the PMOS transistor M3 to the input pin $V_{IN}$.

A state of the selector 274 is controlled according to a switch control signal SWCNT and a comparison signal VINCOMP. When the switch control signal SWCNT is high (on-level) and the comparison signal VINCOMP is at a first (low) level, the selector 274 selects the voltage $V_{MID}-\Delta V$ (first mode). When the switch control signal SWCNT is high (on-level) and the comparison signal VINCOMP is at a second (high) level, the selector 274 selects the voltage $V_{ERR3}$ (second mode). Moreover, when the switch control signal SWCNT is low (off-level), the selector 274 selects the voltage $V_C = V_{IN}$ (third mode).

The configuration of the control circuit 200C is as described above. Advantages of the control circuit 200C are to be described.

In the configuration example, both of the boost DC/DC converter and the low dropout regulator operate in the current mode. When the first error amplifier 212 is shared, a phase compensation circuit (a CR circuit connected to the output of the first error amplifier 212) connected to the first error amplifier 212 also at the same time serves as a phase compensation circuit during the operation of a low dropout regulator. That is to say, an advantage that a phase compensation circuit does not need to be separately designed in a boost DC/DC converter or a low dropout regulator is provided.

Figure 13:
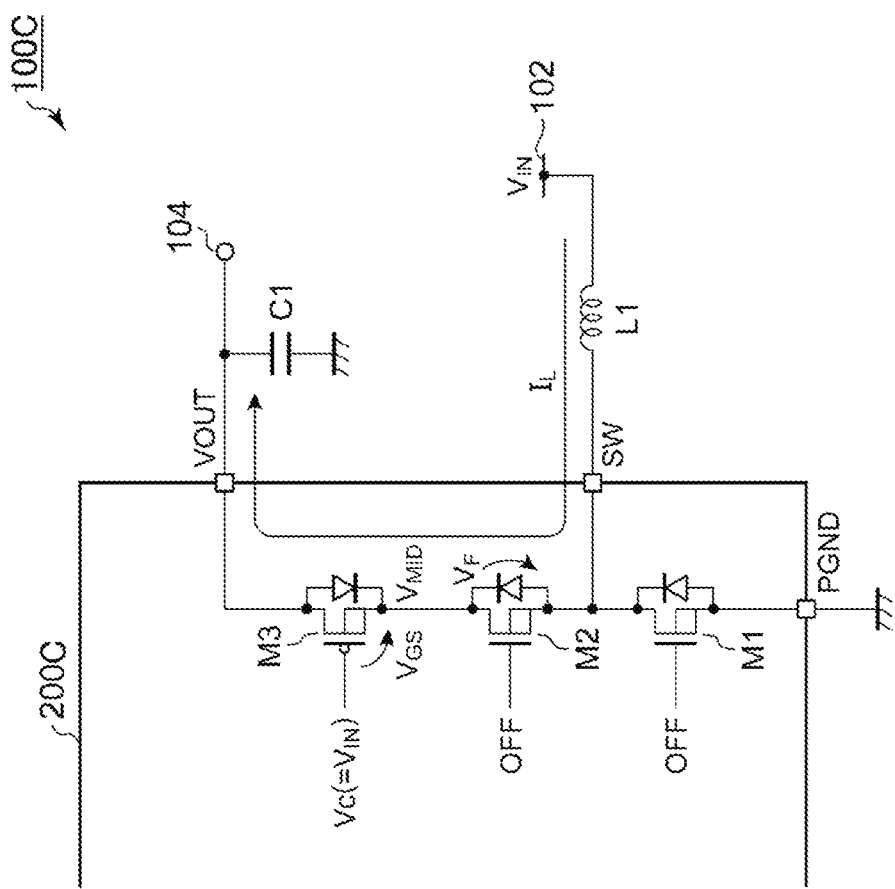
FIG. 13 is an equivalent circuit diagram of a DC/DC converter when a switch control signal SWCTL has just transitioned to low.

Next, advantages of the third mode are described below. If an output stop event occurs in the DC/DC converter 100, the logic circuit 220 sets the switch control signal SWCTL to low. FIG. 13 shows an equivalent circuit diagram of the DC/DC converter 100 when the switch control signal SWCTL has just transitioned to low.

The load switch drive circuit 270 applies the voltage $V_C$ having a same voltage level as the input voltage $V_{IN}$ to the gate of the PMOS transistor M3. At this point in time, the PMOS transistor M3 is not turned off immediately, but operates as a source follower circuit. As a result, the voltage $V_{MID}$ of the connecting node between the load switch SW1 and the high-side transistor M2, that is, the source voltage of the PMOS transistor M3, is clamped to $$V_{MID} = V_C + V_{GS},$$

hence preventing overvoltage.

At this point in time, the voltage $V_{SW}$ of the switch pin SW as the connecting node between the high-side transistor M2 and the low-side transistor M1 becomes $$V_{SW}=V_{MID}+V_f=V_C+V_{GS}=V_F \approx V_{IN}+V_{GS}+V_F,$$

hence similarly inhibiting overvoltage of the switch pin SW.

Moreover, at this point in time, a voltage $V_L$ between two ends of the inductor becomes $$V_L=V_{IN}-V_{SW}=V_{IN}-(V_C+V_{GS}+V_F).$$

As described above, if it is predetermined that $V_C \approx V_{IN}$, then $$V_L \approx (V_{GS}+V_F)$$

Accordingly, the coil current $I_L$ decreases at a tendency $-(V_{GS}+V_F)/L$ along with time. After that, the coil current $I_L$ becomes zero.

Figure 14:
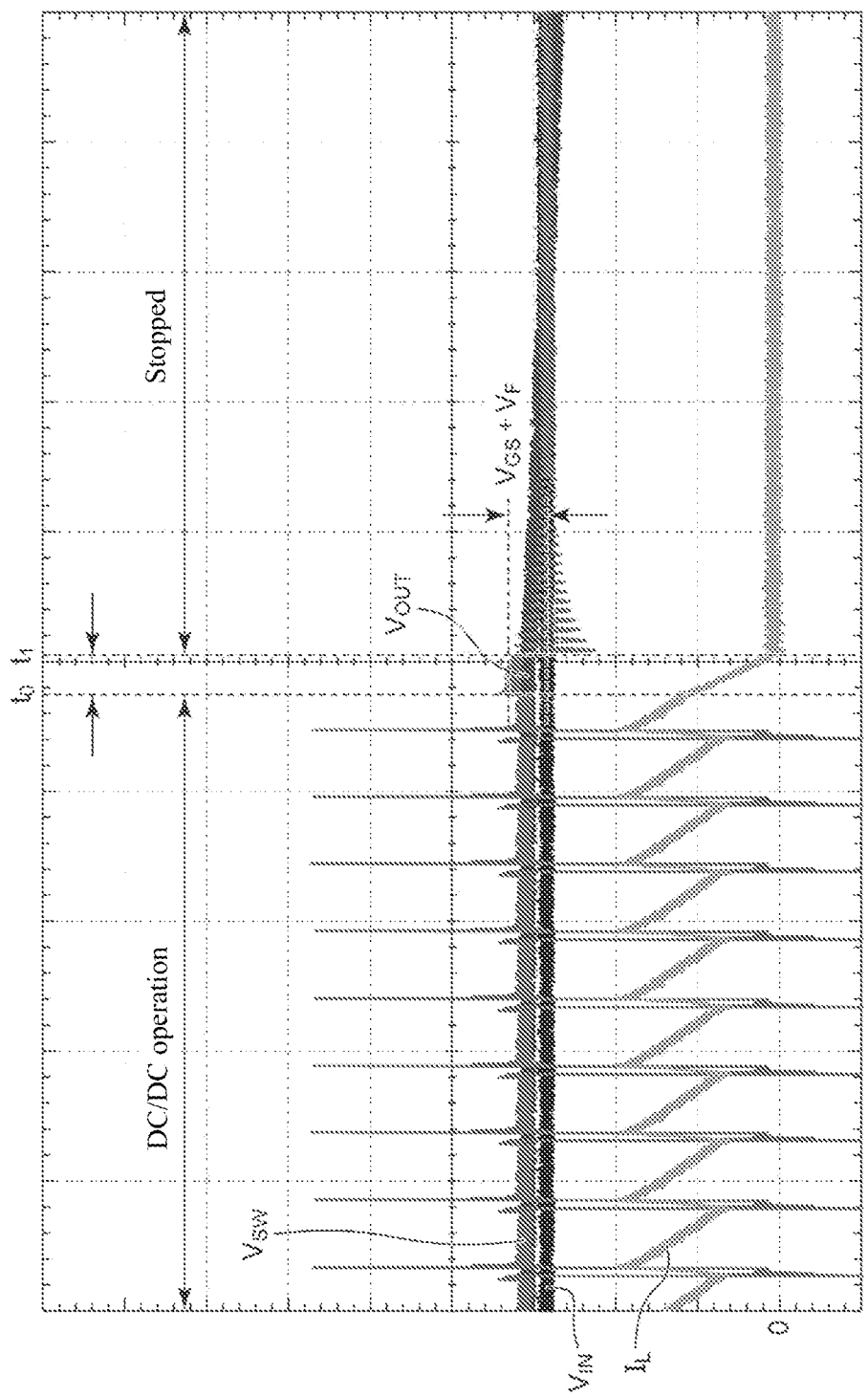
FIG. 14 is a waveform diagram (actual measurement) of the DC/DC converter in FIG. 12.

FIG. 14 shows a waveform diagram (actual measurement) of the DC/DC converter 100 in FIG. 12. FIG. 14 depicts the respective voltages $V_{SW}$, $V_{IN}$ and $V_{OUT}$ of the switch pin SW, the input pin $V_{IN}$ and the output pin $V_{OUT}$ and the coil current $I_L$. Before a timing $t_0$, the DC/DC converter 100 is in a switching operation and the output voltage $V_{OUT}$ is stabilized at the target level $V_{OUT(REF)}$.

If an event that stops triggering is detected at the timing $t_0$, the gate voltages $V_{HG}$ and $V_{LG}$ of the low-side transistor M1 and the high-side transistor M2 become low level, and the voltage $V_C=V_{IN}$ is applied to the gate of the PMOS transistor M3. As a result, the switch voltage $V_{SW}$ is clamped at $V_{IN}+V_{GS}+V_F$. Within this interval, the coil current $I_L$ reduces at a tendency (A/s) of $-(V_{GS}+V_F)/L$, and becomes zero at a timing $t_1$. After the timing $t_1$, the output of the DC/DC converter 100 is stopped.

Figure 15:
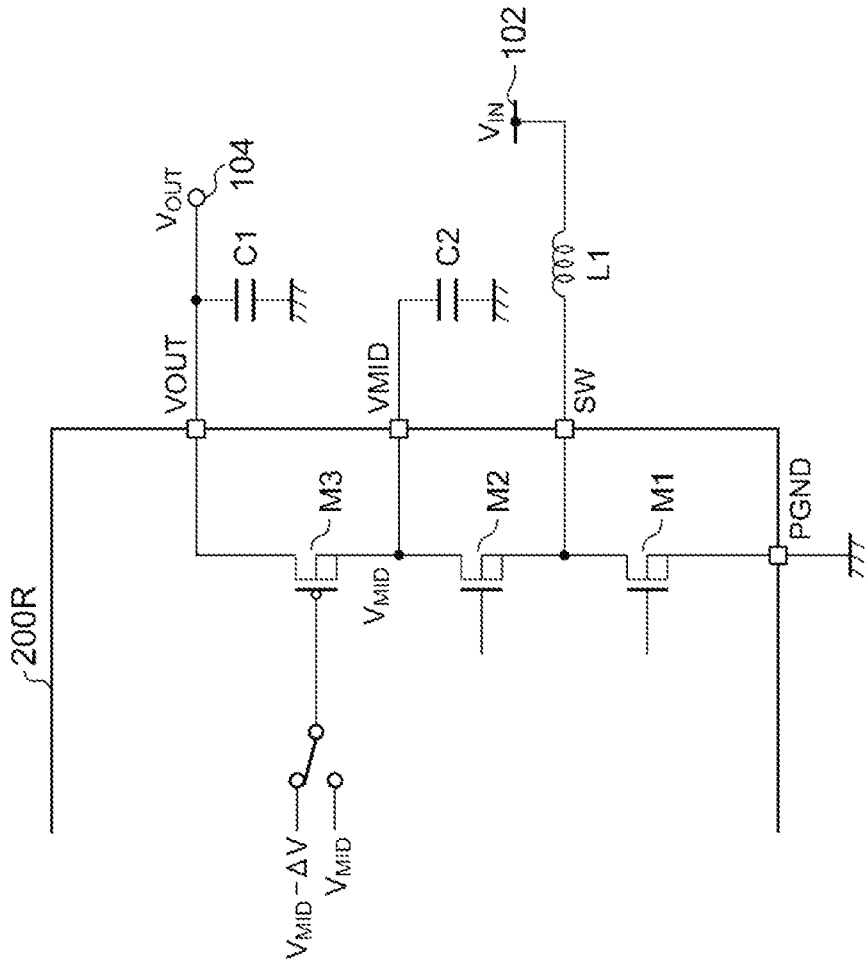
FIG. 15 is a circuit diagram of a DC/DC converter of a third comparison technique.

The operation of the DC/DC converter 100 is as described above. The advantages of the DC/DC converter 100 will become more readily apparent in comparison with a third comparison technique. FIG. 15 shows a circuit diagram of a DC/DC converter 100R of the third comparison technique. The voltage that the third comparison technique applies to the gate of the PMOS transistor M3 when the DC/DC converter 100R is stopped is different from that of the configuration in FIG. 12. In the third comparison technique, in order to immediately turn off the PMOS transistor M3, a voltage the same as the source voltage $V_{MID}$ is applied to the gate to have the gate-source voltage of the PMOS transistor M3 become zero.

In the third comparison technique, since the PMOS transistor M3 is turned off immediately, a path of the coil current $I_L$ is cut off. The coil current $I_L$ continues to flow to the source of the PMOS transistor M3. The source voltage $V_{MID}$ rises, causing a concern for an overvoltage condition. If the source voltage $V_{MID}$ rises, it is possible that the switch voltage $V_{SW}$ becomes an overvoltage condition. In order to inhibit overvoltage, countermeasures of disposing a pin $V_{MID}$ at the source of the PMOS transistor M3 and connecting a capacitor C2 to the pin $V_{MID}$ are needed.

Conversely, according to the configuration in FIG. 12, since the source voltage $V_{MID}$ of the PMOS transistor M3 is clamped, occurrence of overvoltage is unlikely and reliability is improved.

Moreover, in the configuration in FIG. 12, since overvoltage of the source voltage of the PMOS transistor M3 is inhibited, there is no need for a countermeasure for inhibiting overvoltage. That is to say, there is no need to dispose the pin $V_{MID}$ at the PMOS transistor M3 or to connect the capacitor C2. Accordingly, advantages are provided in comparison with the third comparison technique in terms of costs.

Next, a variation example associated with the configuration example in FIG. 12 is to be described below.

Variation Example 1.1

In FIG. 12, the boost DC/DC converter and the low dropout regulator are not limited to both being configured to be in a current mode, and the two may be configured to be in a voltage mode. In this case, a phase compensation circuit needs to be provided in each of the boost DC/DC converter and the low dropout regulator.

Variation Example 1.2

The boost DC/DC converter can also be designed to be in a current mode, and the low dropout regulator can be designed to be in a voltage mode. In this case, the third error amplifier 276 can be omitted, so as to make a modification of inputting the output signal $V_{ERR1}$ of the first error amplifier 212 to the gate of the PMOS transistor M3. Alternatively, a drive circuit for driving the gate of the PMOS transistor M3 or level shifting can be added based on the output signal $V_{ERR1}$ of the first error amplifier 212. In this case, a phase compensation circuit also needs to be provided in each of the boost DC/DC converter and the low dropout regulator.

Variation Example 1.3

In FIG. 12, in the third mode, the voltage $V_C$ based on the input voltage $V_{IN}$ is applied to the gate of the PMOS transistor M3; however, similar to the third comparison technique, the gate-source voltage of the PMOS transistor M3 can also be set to zero in the third mode. In this case, a countermeasure against overvoltage of additionally disposing a pin to the source of the PMOS transistor M3 or providing an external capacitor is implemented.

Second Implementation Example

Figure 16:
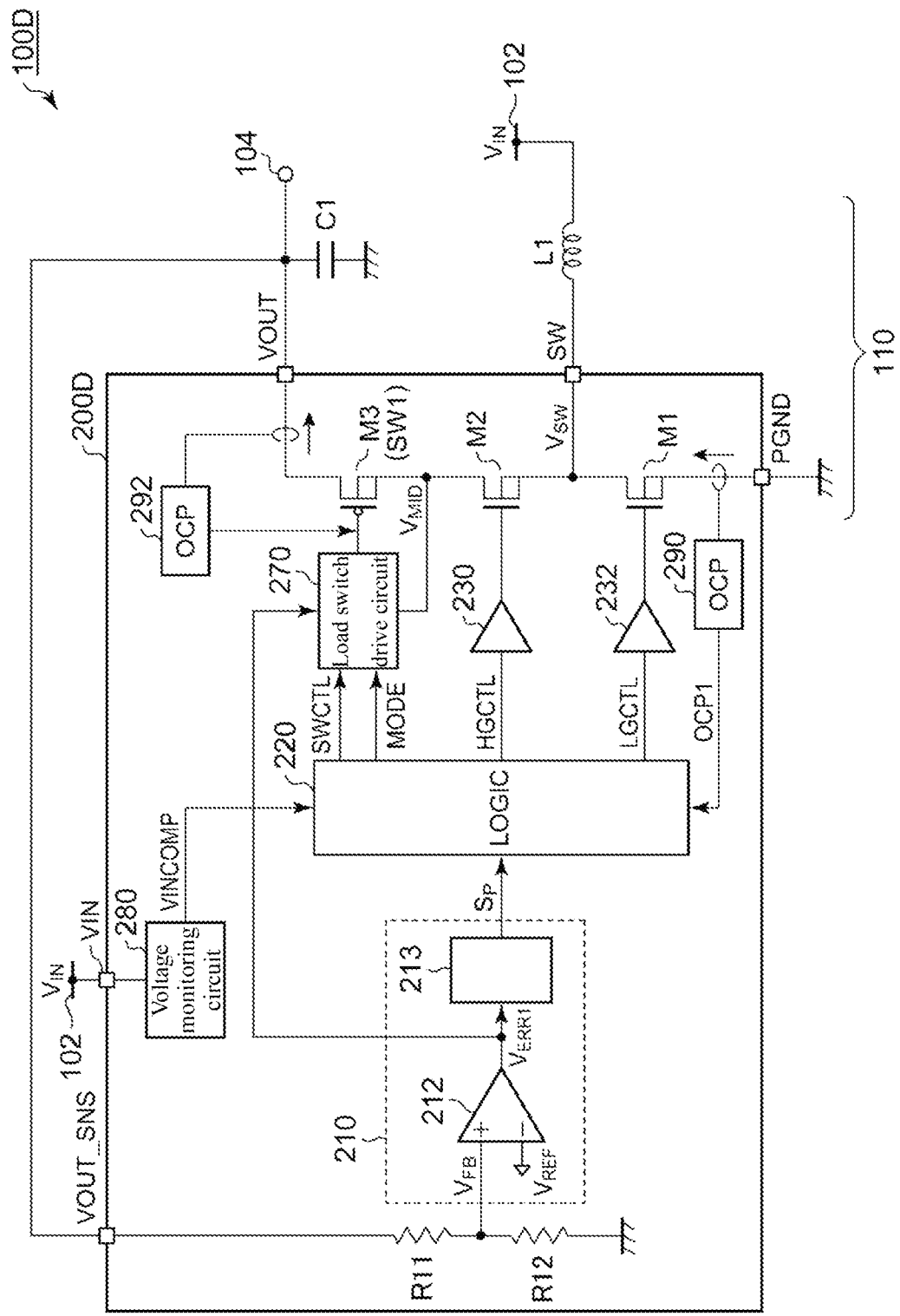
FIG. 16 is a block diagram of a DC/DC converter according to a second implementation example.

FIG. 16 shows a block diagram of a DC/DC converter 100D according to the second implementation example. In the second implementation example, similar to the first implementation example, except for the input voltage $V_{IN}$ that exceeds the threshold voltage $V_{TH}$, the second mode is selected in an overcurrent condition.

In addition to the control circuit 200 in FIG. 1, a control circuit 200D further includes a first overcurrent protection circuit 290 and a second overcurrent protection circuit 292.

The first overcurrent protection circuit 290 limits the coil current $I_L$ flowing through the inductor L1 to not exceed a first threshold current $I_{OCP1}$ when the DC/DC converter 100D is in a switching operation as a boost converter. The first overcurrent protection circuit 290 can monitor an average current of the coil current $I_L$, and can monitor a valley current or a peak value of the coil current $I_L$. The first overcurrent protection circuit 290 can also perform a so-called pulse-by-pulse overcurrent protection. For example, the first overcurrent protection circuit 290 asserts an overcurrent protection signal OCP1 when the coil current $I_L$ has reached a first threshold current. The logic circuit 220 immediately turns off the low-side transistor M1 in response to the asserted overcurrent protection signal OCP1.

The second overcurrent protection circuit 292 limits the current $I_{OUT(LDO)}$ flowing through the PMOS transistor M3 to not exceed a second threshold current $I_{OCP2}$ when the DC/DC converter 100D operates as a low dropout regulator. For example, the second overcurrent protection circuit 292 lowers the gate-source voltage of the PMOS transistor M3 when the output current $I_{OUT(LDO)}$ exceeds the threshold current. An overcurrent protection characteristic of the second overcurrent protection circuit 292 can be a so-called droop characteristic or an overcurrent protection characteristic.

In the second implementation example, except for when the input voltage $V_{IN}$ exceeds the threshold, the load switch drive circuit 270 also operates in the second mode in the following condition. More specifically, when the duty cycle of the pulse signal Sp reduces to a predetermined value and an overcurrent condition exists, transition to the second mode takes place. The logic circuit 220 can determine the existence of an overcurrent condition by means of monitoring the overcurrent protection signal OCP1. Moreover, in the overcurrent condition, the duty cycle (pulse width) of the low-side control signal LGCTL decreases to a minimum duty cycle (minimum pulse width), and the second mode is selected.

The configuration of the control circuit 200 is as described above.

Figure 17:
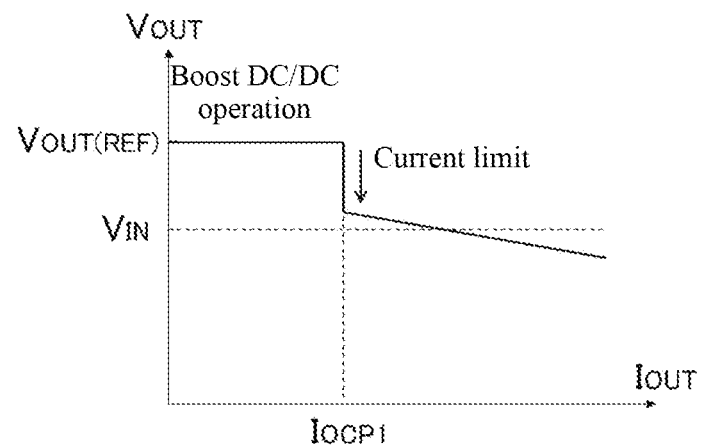
FIG. 17 is a diagram of a current-voltage (V-I) characteristic of a boost DC/DC converter.

Next, the overcurrent protection for a boost DC/DC converter is described. FIG. 17 shows a diagram of a current-voltage (I-V) characteristic of a boost DC/DC converter. If an overcurrent condition occurs when a boost DC/DC converter is in a switching operation, the pulse width (duty cycle) of the low-side control signal LGCTL is decreased by means of a pulse-by-pulse overcurrent protection. As a result, the coil current $I_L$ reduces, and the output voltage $V_{OUT}$ also drops. However, in the control circuit 200D, the minimum pulse width that can be generated as the low-side control signal LGCTL is predetermined, and outputting the low-side control signal LGCTL narrower than that cannot be achieved. That is to say, the output voltage $V_{OUT}$ can only drop to a voltage level slightly higher than the input voltage $V_{IN}$. Assuming that the output line 104 is grounded, $V_{OUT}<V_{IN}$; however, in this case, current limitation is not applied and an overcurrent continues to flow.

Figure 18:
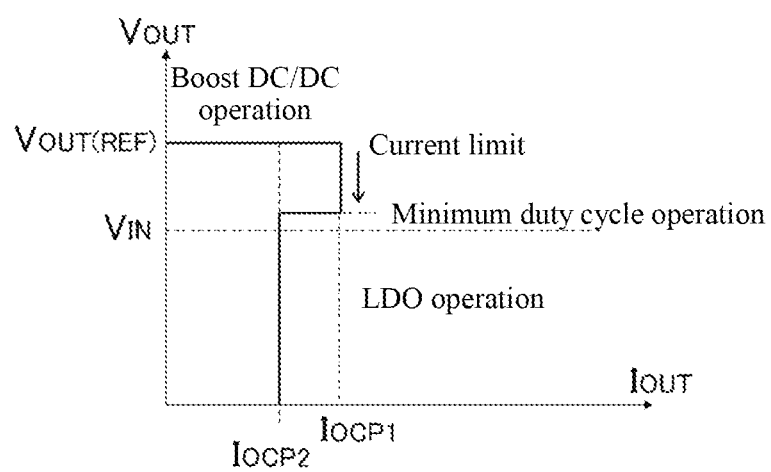
FIG. 18 is a diagram of overcurrent protection of the DC/DC converter according to the second implementation example.

FIG. 18 shows a diagram of an overcurrent protection of the DC/DC converter 100D according to the second implementation example. If the overcurrent protection is applied during the operation of the boost DC/DC converter, the output voltage $V_{OUT}$ drops to a voltage level slightly higher than the input voltage $V_{IN}$ by means of the overcurrent protection of the first overcurrent protection circuit 290. In this case, the duty cycle of the low-side control signal LGCTL becomes a minimum value, and becomes a minimum duty cycle for operation. If the logic circuit 220 detects the minimum duty cycle, the load switch drive circuit 270 switches to the second mode. Accordingly, the DC/DC converter 100D starts to operate as a low dropout regulator. When operation as a low dropout regulator is performed, due to the overcurrent protection of the second overcurrent protection circuit 292, the output current $I_{OUT(LDO)}$ can be inhibited to below the threshold current $I_{OCP2}$ and the output voltage $V_{OUT}$ can be reduced.

Herein, the second threshold current $I_{OCP2}$ can be predetermined to be lower than the first threshold current $I_{OCP1}$. Accordingly, the hysteresis in the first mode and the second mode can be set for a resistive load, and so oscillation can be inhibited.

Figure 19:
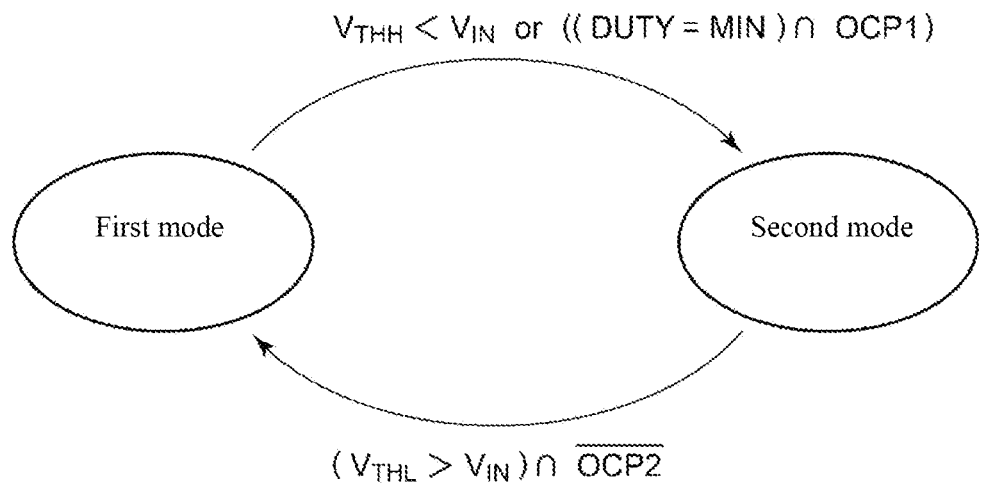
FIG. 19 is a diagram of state transition of the DC/DC converter according to the second implementation example.

FIG. 19 shows a diagram of state transition of the DC/DC converter 100D according to the second implementation example. In the first mode, transition to the second mode takes place when $V_{IN}>V_{THH}$. Moreover, in the first mode, when a duty cycle DUTY of the low-side control signal LGCTL is a minimum value MIN and an overcurrent condition (OCP1 is asserted) exists, transition to the second mode takes place.

In the second mode, when $V_{IN}<V_{THL}$ and a non-overcurrent condition (OCP2 is deasserted) exists, transition to the first mode takes place.

Third Implementation Example

In the second implementation example, both mode transition based on the input voltage $V_{IN}$ and mode transition in the overcurrent condition take place. In comparison, in the third implementation example, mode transition based on the input voltage $V_{IN}$ does not occur but only mode transition in the overcurrent condition takes place.

Figure 20:
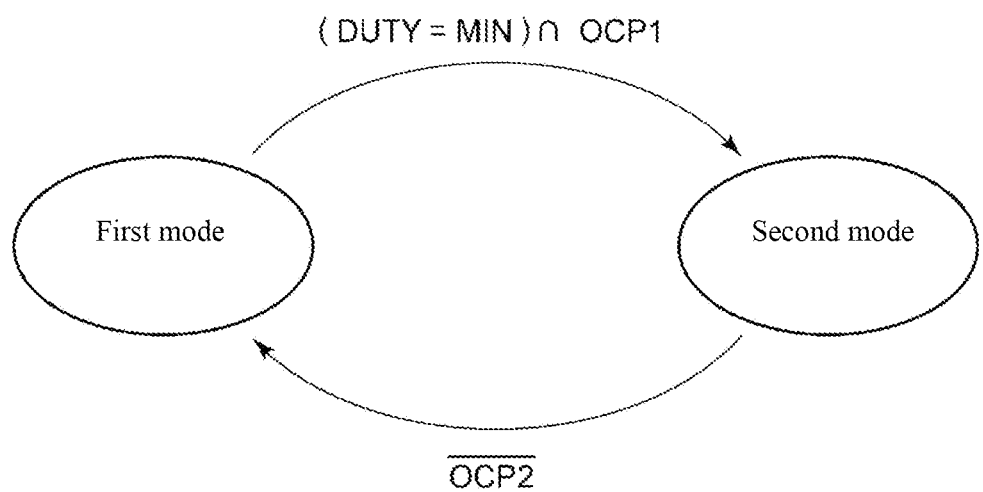
FIG. 20 is a diagram of state transition of a DC/DC converter according to a third implementation example.

FIG. 20 shows a diagram of state transition of a DC/DC converter according to the third implementation example. In the first mode, when the duty cycle DUTY of the low-side control signal LGCTL is a minimum value MIN and an overcurrent condition (OCP1 is asserted) exists, transition to the second mode takes place.

In the second mode, with the change to a non-overcurrent condition (OCP2 is deasserted), transition to the first mode takes place.

The third implementation example is useful in applications and platforms where the input voltage $V_{IN}$ does not exceed the target level $V_{OUT(REF)}$ of the output voltage $V_{OUT}$.

Variation Examples

The embodiments are illustrative, and a person skilled in the art would be able to understand that, there are other various variation examples of combinations of the constituting elements and processes. Details of such variation examples are given in the description below.

Associated with the first to third embodiments, the low-side transistor M1 and the high-side transistor M2 can also be provided as external discrete elements.

Moreover, associated with the first to third embodiments, the PMOS transistor M3 can also be provided as an external discrete element. In this case, a part or all of the load switch drive circuit 270 can also be formed as discrete elements outside the integrated circuit of the control circuit 200.

Moreover, associated with the second implementation example and the third implementation example, the first overcurrent protection circuit 290 can detect a current flowing through the inductor L1, and can detect a current flowing through the high-side transistor M2. Moreover, the second overcurrent protection circuit 292 can also detect a coil current flowing through the inductor L1.

In the embodiment, the boost DC/DC converter having the load switch SW1 is described; however, the present disclosure is also applicable to a boost DC/DC converter having a high-side switch.

Figure 21:
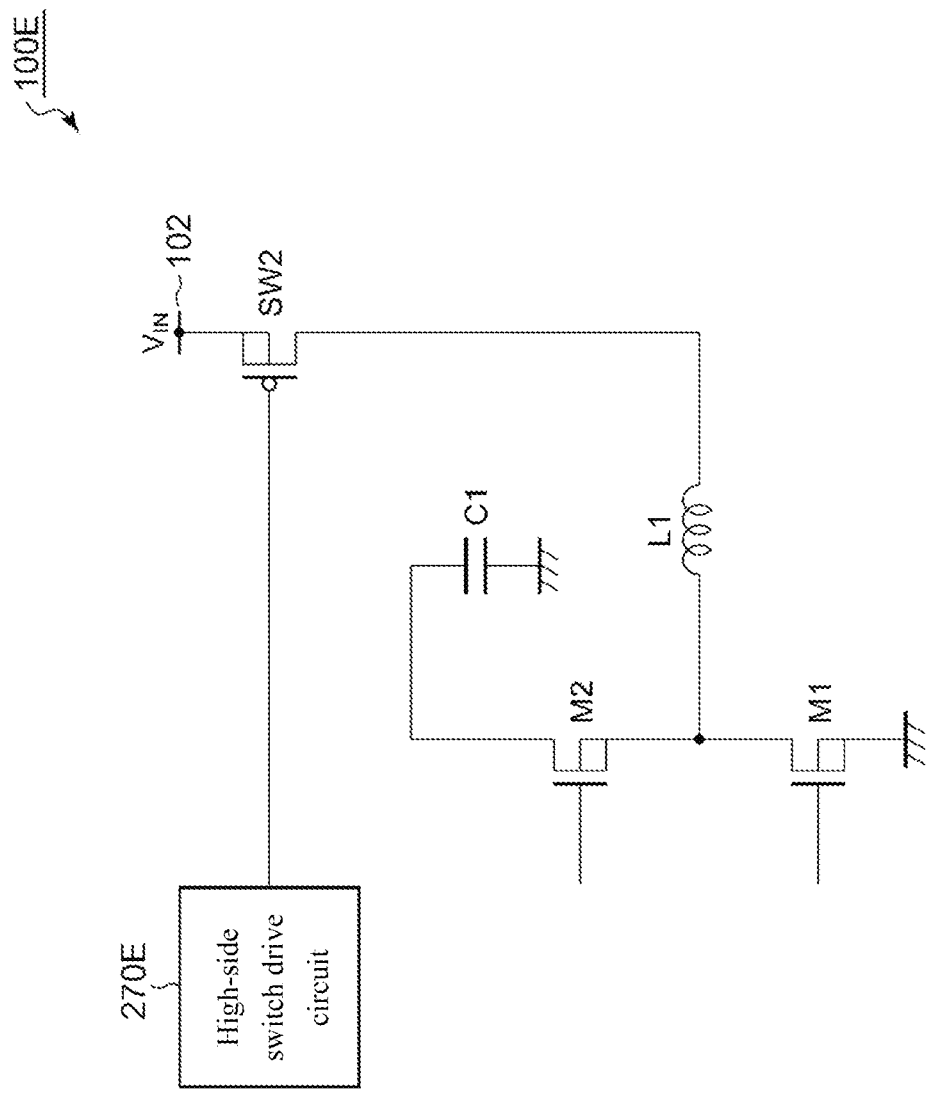
FIG. 21 is a circuit diagram of a DC/DC converter having a high-side switch.

FIG. 21 shows a circuit diagram of a DC/DC converter 100E having a high-side switch. The DC/DC converter 100E includes a high-side switch SW2 in substitution for the low-side switch SW1. The high-side switch SW2 is a PMOS transistor, and is disposed between the input line 102 of the DC/DC converter 100E and the inductor L1. The control circuit 200 includes a high-side switch drive circuit 270E in substitution for the load switch drive circuit 270.

(Use)

The use of the DC/DC converter 100 is described below.

Figure 22:
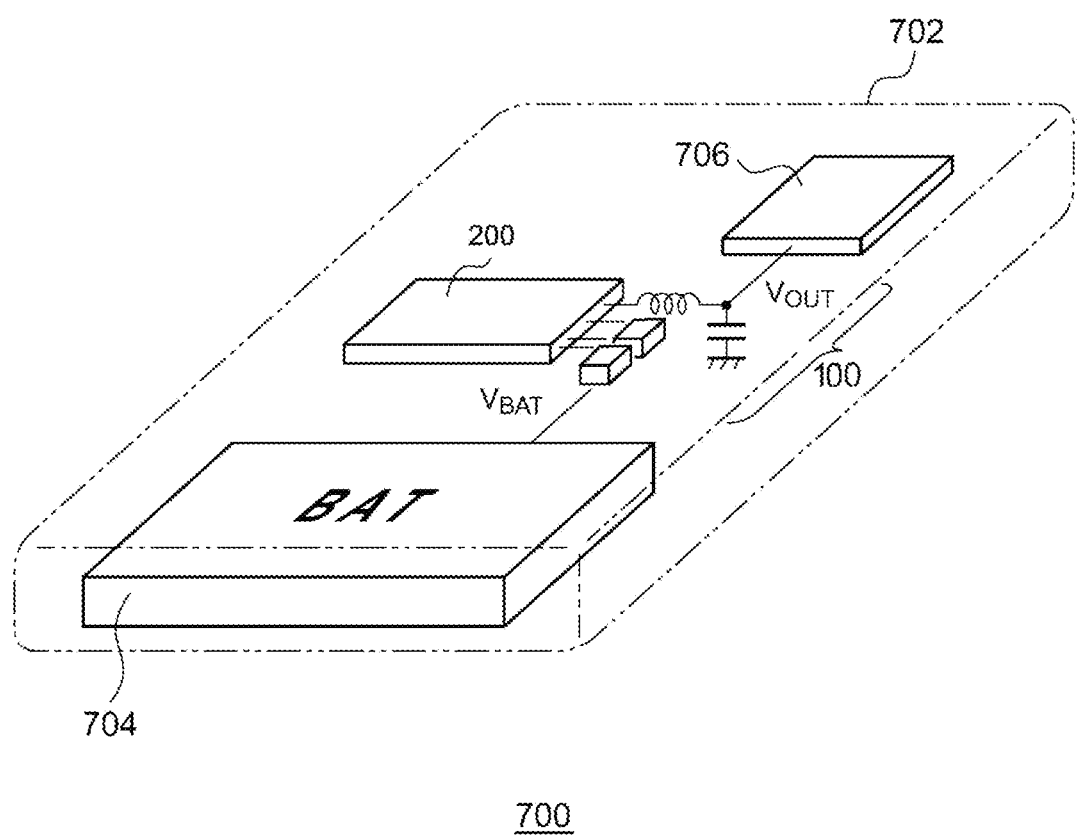
FIG. 22 is a diagram of an example of an electronic device having the DC/DC converter of an embodiment.

FIG. 22 shows a diagram of an example of an electronic device 700 having the DC/DC converter 100 of the embodiments. The electronic device 700 is, for example, a battery driven device such as a mobile phone terminal, a digital camera, a digital video recorder, a tablet terminal, and a portable audio player. The electronic device 700 includes a housing 702, a battery 704, a microprocessor 706 and the DC/DC converter 100. An input terminal of the DC/DC converter 100 receives a battery voltage VBAT ($=V_{IN}$) from the battery 704, and supplies the output voltage $V_{OUT}$ to a load connected to the output terminal.

The type of the electronic device 700 is not limited to a battery driven device, but can also be an in-vehicle device, an office automation (OA) device such as a fax machine, or an industrial device.

NOTES

The present application discloses the following techniques.

(Item 1)

A control circuit for a boost DC/DC converter including an N-type high-side transistor and a low-side transistor, the control circuit comprising:
- a bootstrap pin, configured to connect to an end of a bootstrap capacitor;
- a charge pump circuit, configured to operate at least during startup of the boost DC/DC converter;
- a first rectifying element, configured to apply an output voltage of the charge pump circuit to the bootstrap pin;
- a pulse modulator, including a first error amplifier configured to amplify an error between a feedback signal and a reference voltage according to an output voltage of the boost DC/DC converter, and configured to generate a pulse signal that is pulse-modulated according to an output signal of the first error amplifier;
- a logic circuit, configured to generate a high-side control signal and a low-side control signal based on the pulse signal; and
- a switch drive circuit, configured to drive a switch which is a P-channel metal oxide semiconductor (PMOS) transistor connected between the high-side transistor and a load or between an input terminal of the boost DC/DC converter and an inductor,
- wherein the switch drive circuit is configured to be switchable between (i) a first mode in which the PMOS transistor is fully turned on; and (ii) a second mode in which a drive voltage corresponding to the output signal of the first error amplifier is supplied to a gate of the PMOS transistor.

(Item 2)

The control circuit of Item 1, further comprising a second rectifying element configured to apply a power supply voltage to the bootstrap pin.

(Item 3)

The control circuit of Item 1 or 2, wherein the charge pump circuit also continues operating after completion of startup of the boost DC/DC converter.

(Item 4)

The control circuit of any one of Items 1 to 3, wherein the charge pump circuit starts operation before the boost DC/DC converter starts to start up.

(Item 5)

The control circuit of Item 2, wherein a current supply ability of the charge pump circuit is lower than a current supply ability of the second rectifying element.

(Item 6)

The control circuit of Item 2, wherein the charge pump circuit is an addition type charge pump circuit configured to add a switching voltage of the boost DC/DC converter and the power supply voltage.

(Item 7)

The control circuit of any one of Items 1 to 6, wherein the switch drive circuit (i) becomes the first mode when an input voltage of the boost DC/DC converter is lower than a threshold voltage that is predetermined, and (ii) becomes the second mode when the input voltage is higher than the threshold voltage.

(Item 8)

The control circuit of any one of Items 1 to 7, further comprising:
- a first current detection circuit, configured to generate a first current detection signal indicating a coil current flowing through an inductor of the boost DC/DC converter when the boost DC/DC converter is in a switching operation; and
- a second current detection circuit, configured to generate a second current detection signal indicating a current flowing through the PMOS transistor when a switching operation of the boost DC/DC converter is stopped,
- wherein the pulse modulator further includes a second error amplifier configured to amplify an error between the output signal of the first error amplifier and the first current detection signal to generate the pulse signal having a duty cycle according to an output of the second error amplifier, and
- the switch drive circuit includes a third error amplifier configured to amplify an error between the output signal of the first error amplifier and the second current detection signal, and configured to supply the drive voltage according to an output signal of the third error amplifier to the gate of the PMOS transistor in the second mode.

(Item 9)

The control circuit of Item 7, wherein the threshold voltage is set within a range of 0.9 to 1.1 times of a target level of the output voltage.

(Item 10)

The control circuit of Item 9, wherein the threshold voltage has hysteresis.

(Item 11)

The control circuit of Item 10, wherein both upper and lower thresholds of the threshold voltage having hysteresis are lower than the target level of the output voltage.

(Item 12)

The control circuit of Item 10, wherein both upper and lower thresholds of the threshold voltage having hysteresis are higher than the target level of the output voltage.

(Item 13)

The control circuit of Item 10, wherein an upper threshold of the threshold voltage having hysteresis is higher than the target level of the output voltage, and a lower threshold of the threshold voltage having hysteresis is lower than the target level of the output voltage.

(Item 14)

The control circuit of any one of Items 1 to 13, further comprising:
- a first overcurrent protection circuit, configured to limit a coil current flowing through the inductor to not exceed a first threshold current; and a second overcurrent protection circuit, configured to limit the current flowing through the PMOS transistor in the second mode to not exceed a second threshold current, wherein the switch drive circuit enters the second mode when a duty cycle of the low-side control signal has decreased to a minimum value and an overcurrent condition exists.

(Item 15)

The control circuit of Item 14, wherein the second threshold current is lower than the first threshold current.

(Item 16)

The control circuit of Item 14 or 15, wherein the switch drive circuit (i) becomes the first mode when an input voltage of the boost DC/DC converter is lower than the threshold voltage that is predetermined, and (ii) becomes the second mode when the input voltage is higher than the threshold voltage, and wherein the switch drive circuit transitions to the first mode when the input voltage is lower than the threshold voltage and no overcurrent condition exists in the second mode.

(Item 17)

The control circuit of any one of Items 1 to 16, wherein in the first mode, the switch drive circuit applies an on-voltage to the gate of the PMOS transistor, wherein the on-voltage is lower than a source voltage of the PMOS transistor by a predetermined voltage width.

(Item 18)

The control circuit of any one of Items 1 to 17, wherein the switch drive circuit changes to a third mode when stopping the boost DC/DC converter, and applies a voltage corresponding to the input voltage of the boost DC/DC converter to the gate of the PMOS transistor.

(Item 19)

The control circuit of any one of Items 1 to 18, wherein the control circuit is monolithically integrated on a semiconductor substrate.

(Item 20)

A power supply circuit, comprising:
a main circuit of a DC/DC converter; and
the control circuit of any one of Items 1 to 19.

(Item 21)

An electronic device, comprising the control circuit of any one of Items 1 to 19.

A person skilled in the art should understand that these embodiments are merely examples and there are various variation examples of combinations of the constituting elements and processes of these embodiments. Moreover, such variation examples are encompassed within the present disclosure or the scope of the present disclosure.

The invention claimed is:

1. A control circuit for a boost DC/DC converter including an N-type high-side transistor and a low-side transistor, the control circuit comprising:
    a bootstrap pin, configured to connect to an end of a bootstrap capacitor;
    a charge pump circuit, configured to operate at least during startup of the boost DC/DC converter;
    a first rectifying element, configured to apply an output voltage of the charge pump circuit to the bootstrap pin;
    a pulse modulator,
        including a first error amplifier configured to amplify an error between a feedback signal and a reference voltage according to an output voltage of the boost DC/DC converter, and
        configured to generate a pulse signal that is pulse-modulated according to an output signal of the first error amplifier;
    a logic circuit, configured to generate a high-side control signal and a low-side control signal based on the pulse signal; and
    a switch drive circuit, configured to drive a switch which is a P-channel metal oxide semiconductor (PMOS) transistor connected between the high-side transistor and a load or between an input terminal of the boost DC/DC converter and an inductor, wherein
    the switch drive circuit is configured to be switchable between
        (i) a first mode in which the PMOS transistor is fully turned on; and
        (ii) a second mode in which a drive voltage corresponding to the output signal of the first error amplifier is supplied to a gate of the PMOS transistor.

2. The control circuit of claim 1, further comprising a second rectifying element configured to apply a power supply voltage to the bootstrap pin.

3. The control circuit of claim 2, wherein a current supply ability of the charge pump circuit is lower than a current supply ability of the second rectifying element.

4. The control circuit of claim 2, wherein the charge pump circuit is an addition type charge pump circuit configured to add a switching voltage of the boost DC/DC converter and the power supply voltage.

5. The control circuit of claim 1, wherein the charge pump circuit also continues operating after completion of startup of the boost DC/DC converter.

6. The control circuit of claim 1, wherein the charge pump circuit starts operation before the boost DC/DC converter starts to start up.

7. The control circuit of claim 1, wherein the switch drive circuit
    (i) becomes the first mode when an input voltage of the boost DC/DC converter is lower than a threshold voltage that is predetermined, and
    (ii) becomes the second mode when the input voltage is higher than the threshold voltage.

8. The control circuit of claim 7, wherein the threshold voltage is set within a range of 0.9 to 1.1 times of a target level of the output voltage.

9. The control circuit of claim 8, wherein the threshold voltage has hysteresis.

10. The control circuit of claim 9, wherein both upper and lower thresholds of the threshold voltage having hysteresis are lower than the target level of the output voltage.

11. The control circuit of claim 9, wherein both upper and lower thresholds of the threshold voltage having hysteresis are higher than the target level of the output voltage.

12. The control circuit of claim 9, wherein
    an upper threshold of the threshold voltage having hysteresis is higher than the target level of the output voltage, and
    a lower threshold of the threshold voltage having hysteresis is lower than the target level of the output voltage.

13. The control circuit of claim 1, further comprising:
    a first current detection circuit, configured to generate a first current detection signal indicating a coil current flowing through an inductor of the boost DC/DC converter when the boost DC/DC converter is in a switching operation; and
    a second current detection circuit, configured to generate a second current detection signal indicating a current flowing through the PMOS transistor when a switching of the boost DC/DC converter is stopped, wherein the pulse modulator further includes a second error amplifier configured to amplify an error between the output signal of the first error amplifier and the first current detection signal to generate the pulse signal having a duty cycle according to an output of the second error amplifier, and the switch drive circuit includes a third error amplifier configured to amplify an error between the output signal of the first error amplifier and the second current detection signal, and configured to supply the drive voltage according to an output signal of the third error amplifier to the gate of the PMOS transistor in the second mode.

14. The control circuit of claim 1, further comprising:

a first overcurrent protection circuit, configured to limit a coil current flowing through the inductor to not exceed a first threshold current; and a second overcurrent protection circuit, configured to limit the current flowing through the PMOS transistor in the second mode to not exceed a second threshold current, wherein the switch drive circuit enters the second mode when a duty cycle of the low-side control signal has decreased to a minimum value and an overcurrent condition exists.

15. The control circuit of claim 14, wherein the second threshold current is lower than the first threshold current.

16. The control circuit of claim 14, wherein the switch drive circuit (i) becomes the first mode when an input voltage of the boost DC/DC converter is lower than a threshold voltage that is predetermined, and (ii) becomes the second mode when the input voltage is higher than the threshold voltage, and wherein the switch drive circuit transitions to the first mode when the input voltage is lower than the threshold voltage and no overcurrent condition exists in the second mode.

17. The control circuit of claim 1, wherein in the first mode, the switch drive circuit applies an on-voltage to the gate of the PMOS transistor, wherein the on-voltage is lower than a source voltage of the PMOS transistor by a predetermined voltage width.

18. The control circuit of claim 1, wherein the switch drive circuit changes to a third mode when stopping the boost DC/DC converter, and applies a voltage corresponding to an input voltage of the boost DC/DC converter to the gate of the PMOS transistor.

19. The control circuit of claim 1, wherein the control circuit is monolithically integrated on a semiconductor substrate.

20. A power supply circuit, comprising:

a main circuit of a DC/DC converter; and the control circuit of claim 1.

21. An electronic device, comprising the control circuit of claim 1.

* * * * *